United States Patent
Mizoi et al.

(10) Patent No.: US 11,858,392 B2
(45) Date of Patent: Jan. 2, 2024

(54) VEHICLE SEAT AND VEHICLE PROVIDED WITH VEHICLE SEAT

(71) Applicant: TS TECH CO., LTD., Asaka (JP)

(72) Inventors: Kensuke Mizoi, Tochigi (JP); Naoto Yamauchi, Tochigi (JP)

(73) Assignee: TS TECH CO., LTD.

( * ) Notice: Subject to any disclaimer, the term of this patent is extended or adjusted under 35 U.S.C. 154(b) by 144 days.

(21) Appl. No.: 17/434,895

(22) PCT Filed: Feb. 28, 2020

(86) PCT No.: PCT/JP2020/008367
§ 371 (c)(1),
(2) Date: Aug. 30, 2021

(87) PCT Pub. No.: WO2020/179673
PCT Pub. Date: Sep. 10, 2020

(65) Prior Publication Data
US 2022/0055510 A1    Feb. 24, 2022

Related U.S. Application Data

(60) Provisional application No. 62/812,586, filed on Mar. 1, 2019.

(51) Int. Cl.
*B60N 2/02* (2006.01)
*B60N 2/66* (2006.01)
*B60N 2/75* (2018.01)

(52) U.S. Cl.
CPC ............. *B60N 2/66* (2013.01); *B60N 2/0268* (2023.08); *B60N 2/77* (2018.02); *B60N 2/777* (2018.02)

(58) Field of Classification Search
CPC ................. B60N 2002/0268; B60N 2/0268
See application file for complete search history.

(56) References Cited

U.S. PATENT DOCUMENTS

| 10,293,718 B1 * | 5/2019 | Ilievski ................ B60N 2/0244 |
| 2005/0127728 A1 * | 6/2005 | Sugiyama .............. B60N 2/665 297/284.3 |

(Continued)

FOREIGN PATENT DOCUMENTS

| CN | 109606210 A | * | 4/2019 | |
| CN | 110217140 A | * | 9/2019 | ........... B60N 2/0232 |

(Continued)

OTHER PUBLICATIONS

PCT International Search Report (w/ English translation) for corresponding PCT Application No. PCT/JP2020/008367, dated Mar. 31, 2020—6 pages.

*Primary Examiner* — Timothy J Brindley
(74) *Attorney, Agent, or Firm* — Dority & Manning, P.A.

(57) ABSTRACT

To provide a vehicle seat with a function of reducing fatigue regardless of the physique of the seated person, a vehicle seat includes: an ischial tuberosity support device that is driven to change a position of a part of a seat cushion corresponding to ischial tuberosities of a seated person; a sacrum/ilium support device that is driven to change a position of a part of a seat back corresponding to the sacrum and ilia of the seated person; a ninth thoracic vertebra support device that is driven to change a position of a part of the seat back corresponding to a ninth thoracic vertebra of the seated person; and a control device, wherein the control device sequentially executes: an information acquisition step of acquiring physique information of the seated person; a decision step of deciding parameters regarding a driving amount of each of the ischial tuberosity support device, the sacrum/ilium support device, and the ninth thoracic vertebra support device based on the acquired physique information; and an output step of driving the ischial tuberosity support device, the sacrum/ilium support device, and the ninth (Continued)

thoracic vertebra support device based on the corresponding parameters.

9 Claims, 12 Drawing Sheets

(56) References Cited

U.S. PATENT DOCUMENTS

| | | | | |
|---|---|---|---|---|
| 2014/0379224 A1* | 12/2014 | Hyde | ................... | B60N 2/002 |
| | | | | 701/49 |
| 2016/0239175 A1 | 8/2016 | Yukiyoshi et al. | | |
| 2017/0158102 A1* | 6/2017 | Murray | ................. | B60N 2/501 |
| 2018/0022246 A1* | 1/2018 | Patrick | ................... | B60N 2/914 |
| | | | | 297/284.3 |
| 2018/0134181 A1* | 5/2018 | Ketels | ................. | B60N 2/0252 |
| 2019/0337412 A1* | 11/2019 | Zouzal | ................. | B60N 2/0248 |
| 2019/0344043 A1* | 11/2019 | Migneco | ............. | B60N 2/0244 |
| 2020/0245770 A1* | 8/2020 | Munechika | ............ | A47C 7/467 |
| 2021/0016686 A1* | 1/2021 | Yetukuri | ............. | B60N 2/5621 |

FOREIGN PATENT DOCUMENTS

| | | | | |
|---|---|---|---|---|
| DE | 102016121871 A1 * | 5/2017 | ........... | B60N 2/0244 |
| DE | 102017212791 A1 * | 2/2018 | ......... | B60H 1/00285 |
| DE | 102018114611 A1 * | 12/2018 | ............. | B60N 2/643 |
| EP | 3575144 A1 * | 12/2019 | ............. | A47C 7/467 |
| JP | H6-270895 | 9/1994 | | |
| JP | 2003-127740 | 5/2003 | | |
| JP | 2013-538755 | 10/2013 | | |
| JP | 2017-136994 | 8/2017 | | |
| WO | WO-2012048100 A2 * | 4/2012 | ............. | B60N 2/002 |
| WO | WO-2016206277 A1 * | 12/2016 | ........... | B60N 2/0244 |

* cited by examiner

| height range [cm] | weight range [cm] | body type group | parameters of deformation devices ||||| parameters of driving devices ||||
| --- | --- | --- | --- | --- | --- | --- | --- | --- | --- | --- | --- |
| | | | internal pressure value of airbag of ischial tuberosity support device | internal pressure value of airbag of sacrum/ilium support device | internal pressure value of airbag of ninth thoracic vertebra support device | middle fold angle | expansion/ contraction amount of seat cushion | reclining angle | headrest lift amount | slide amount | height amount | tilt angle |
| 145-155 | 45-54 | thin | 1.15 | 1.08 | 0.95 | 5 | 2 | 0 | 3 | 10 | 0 | 0 |
| 145-155 | 54-63 | standard | 1.13 | 1.06 | 0.96 | 5 | 2 | 0 | 3 | 10 | 0 | 0 |
| ... | ... | ... | ... | ... | ... | ... | ... | ... | ... | ... | ... | ... |

*Fig.4*

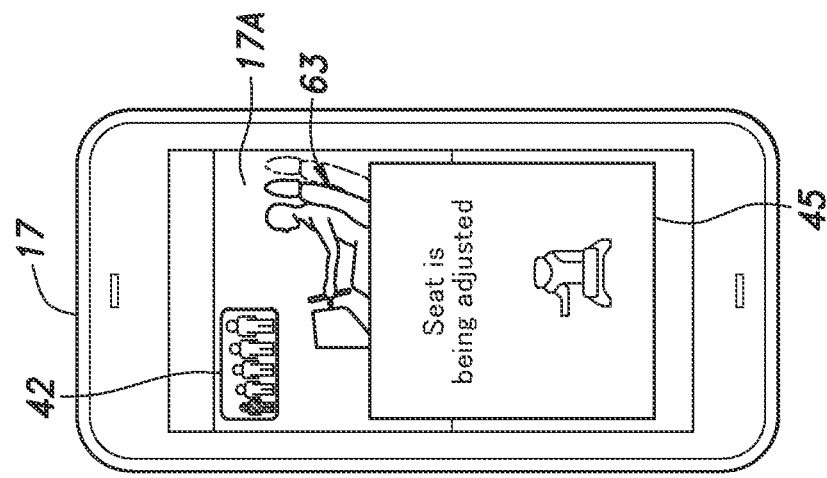
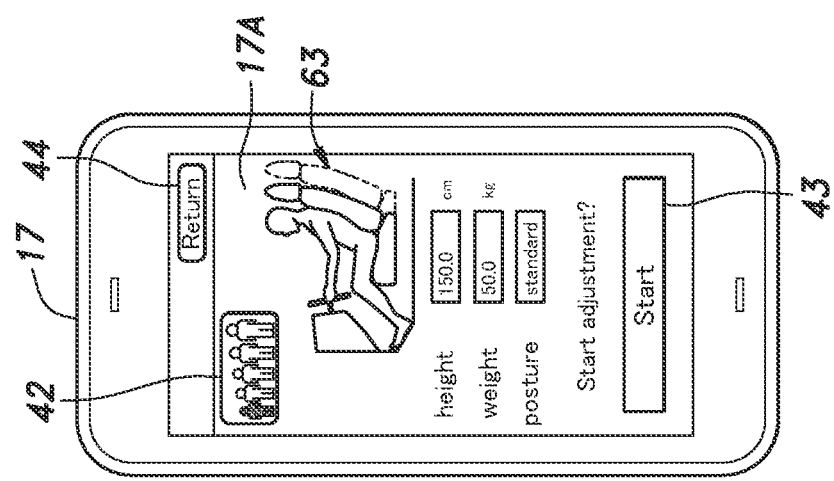
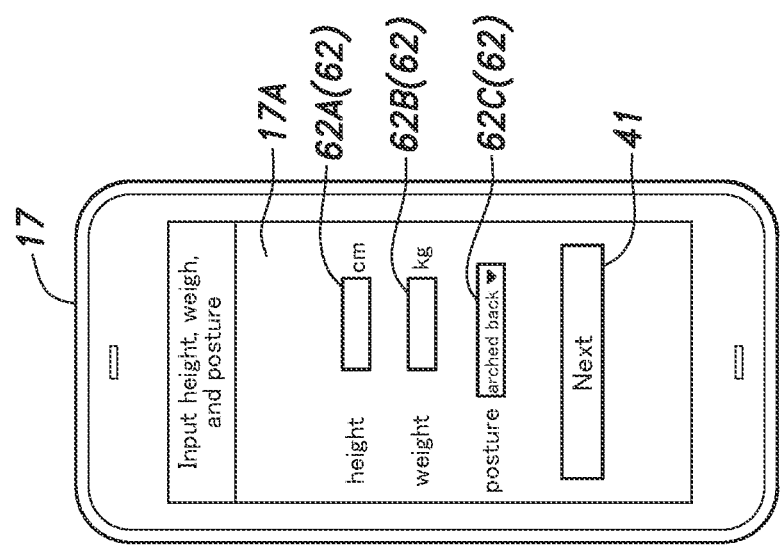
Fig.8

| | arched back | slight arched back | ideal | slight sway back | sway back |
|---|---|---|---|---|---|
| amount of correction of internal pressure value of airbag of ischial tuberosity support device | 0.00 | 0.05 | 0.07 | 0.10 | 0.10 |
| amount of correction of internal pressure value of airbag of sacrum / ilium support device | 0.00 | 0.04 | 0.07 | 0.08 | 0.08 |
| amount of correction of internal pressure value of airbag of ninth thoracic vertebra support device | 0.05 | 0.05 | 0.03 | 0.00 | 0.00 |

Fig. 9

VEHICLE SEAT AND VEHICLE PROVIDED WITH VEHICLE SEAT

TECHNICAL FIELD

This application is the U.S. national stage entry of International Application No. PCT/JP2020/008367 filed under the Patent Cooperation Treaty and having a filing date of Feb. 28, 2020, which claims priority to U.S. Provisional Patent Application No. 62/812,586 having a filing date of Mar. 1, 2019, which are incorporated herein by reference.

The present invention relates to a vehicle seat and a vehicle provided with the vehicle seat.

BACKGROUND ART

There is known a seating device that individually controls posture adjustment devices of the seating device such as a reclining device, a leg rest device, a lumber support device, a headrest device, a side support device, or a re-support device and performs automatic posture control comprehensively to achieve an optimal posture according to the data input beforehand or the data of the seated person (for example, Patent Document 1).

PRIOR ART DOCUMENT(S)

Patent Document(s)

Patent Document 1: JPH6-270895A

SUMMARY OF THE INVENTION

Task to be Accomplished by the Invention

It is desired that a vehicle seat, which is a seating device, is provided with a function of reducing fatigue, such as lower hack pain, which is caused when seated for a long time. One of the known causes of fatigue when seated for a long time is tension of skeletal muscles, for example.

Therefore, the present inventors have conceived deforming and/or moving the vehicle seat to guide the posture of the seated person to a posture that is less likely to induce fatigue, such as a posture in which the skeletal muscles are relaxed, for example. However, the physique of the seated person who is seated in the vehicle seat varies for each seated person, Therefore, it is not easy to deform and/or move the vehicle seat to guide the posture of the seated person to a posture that is less likely to induce fatigue, regardless of the physique of the seated person.

In view of the above background, an object of the present invention is to provide a vehicle seat with a function for reducing fatigue regardless of the physique of the seated person.

Means to Accomplish the Task

To achieve the above object, one aspect of the present invention provides a vehicle seat (1, 51, 61, 71) provided with a seat cushion (5) and a seat back (6), comprising: an ischial tuberosity support device (26) configured to be driven to change a position of a part of the seat cushion corresponding to ischial tuberosities (P) of a seated person; a sacrum/ilium support device (27) configured to be driven to change a position of a part of the seat back corresponding to a sacrum (Q) and ilia (R) of the seated person; a ninth thoracic vertebra support device (28) configured to be driven to change a position of a part of the seat back corresponding to a ninth thoracic vertebra part (S) of the seated person; and a control device (18) configured to control driving of the ischial tuberosity support device, the sacrum/ilium support device, and the ninth thoracic vertebra support device, wherein the control device is configured to sequentially execute: an information acquisition step (ST1) of acquiring physique information of the seated person; a decision step (ST2) of deciding at least three parameters regarding respective driving amounts of the ischial tuberosity support device, the sacrum/ilium support device, and the ninth thoracic vertebra support device based on the physique information acquired in the information acquisition step to make each of the positions conform to a physique of the seated person; and an output step (ST3) of driving the ischial tuberosity support device, the sacrum/ilium support device, and the ninth thoracic vertebra support device based on the corresponding parameters.

According to this aspect, it is possible to control the posture of the seated person by moving the ischial tuberosities, the sacrum, the ilia, and the ninth thoracic vertebra part by changing each position. Thereby, the posture of the seated person can be controlled to achieve a posture that is less likely to induce fatigue. Also, since the amount of movement of the ischial tuberosities, the sacrum, the ilia, and the ninth thoracic vertebra part can be set in accordance of the physique of the seated person, it is possible to shift the posture of the seated person to an appropriate posture that matches the physique of the seated person and can reduce fatigue.

More preferably, each of the seat cushion and the seat back includes a pad member (5A, 6A) and a skin member (5B, 6B) covering a surface of the pad member, each of the ischial tuberosity support device, the sacrum/ilium support device, and the ninth thoracic vertebra support device includes an air cell (26A, 27A, 28A) disposed between the skin member and the pad member, a sensor (26C, 27C, 28C) configured to acquire an internal pressure value of the air cell, and an air supply and exhaust device (26B, 27B, 28B) configured to supply and exhaust air to and from the air cell to make the internal pressure value a prescribed pressure, and the driving amount of each of the ischial tuberosity support device, the sacrum/ilium support device, and the ninth thoracic vertebra support device is the internal pressure value of the corresponding air cell.

According to this aspect, the positions of the respective parts of the seat cushion and the seat back can be changed easily.

More preferably, in the decision step, the control device decides the driving amounts of the ischial tuberosity support device, the sacrum/ilium support device, and the ninth thoracic vertebra support device so as to reproduce a shape of a back of a human body model in a neutral posture based on the physique information.

According to this aspect, regardless of the physique of the seated person, it is possible to make the shape of the back achieve the shape in the neutral posture which satisfies the intervertebral disc neutral and the skeletal muscle neutral. Thereby, increase in the internal pressure of the intervertebral disc, tension of the skeletal muscles, load on the skin and the skeletal muscle system due to local pressure can be reduced, and hence, fatigue of the seated person can be reduced.

More preferably, the physique information includes information regarding a height and a weight of the seated person, and in the decision step, the control device decides the driving amount of each of the ischial tuberosity support device, the sacrum/ilium support device, and the ninth thoracic vertebra support device based on the information regarding the height and the weight of the seated person.

According to this aspect, it is possible to decide the driving amounts such that the ischial tuberosities, the sacrum, the ilia, and the ninth thoracic vertebra part are positioned at appropriate positions matching the physique of the seated person.

More preferably, the vehicle seat includes a terminal (17) configured to display information to the seated person based on a signal from the control device and to receive an input from the seated person to output the received input to the control device, the terminal being configured to display a reception area (40, 40A, 40B) to receive an input or selection of the height and the weight from the seated person.

According to this aspect, the physique information of the seated person can be acquired conveniently.

More preferably, the terminal determines a body type of the seated person based on the information regarding the height and the weight, and in the decision step, the control device decides the driving amount of each of the ischial tuberosity support device, the sacrum/ilium support device, and the ninth thoracic vertebra support device based on the height, the weight, and the determined body type.

According to this aspect, it is possible to decide the driving amounts such that the ischial tuberosities, the sacrum, the ilia, the ninth thoracic vertebra part are positioned at appropriate positions better matching the physique of the seated person. Also, the body type of the seated person is determined based on the height and the weight. Therefore, it is not necessary for the seated person to separately input the information regarding the body type, and it is possible to enhance the convenience compared to the case where the input is necessary.

More preferably, the physique information includes information regarding a height, a weight, and a body type of the seated person, and in the decision step, the control device decides the driving amount of each of the ischial tuberosity support device, the sacrum/ilium support device, and the ninth thoracic vertebra support device based on the information regarding the height, the weight, and the body type of the seated person.

According to this aspect, it is possible to decide the driving amounts such that the ischial tuberosities, the sacrum, the ilia, and the ninth thoracic vertebra part are positioned at appropriate positions better matching the physique of the seated person.

More preferably, the vehicle seat includes a terminal (17) configured to display information to the seated person based on the signal from the control device and to receive an input from the seated person to output the received input to the control device, the terminal being configured to display a reception area (40C) to receive an input or selection of the information regarding the height, the weight, and the body type of the seated person.

According to this aspect, the physique information of the seated person can be acquired conveniently.

More preferably, the physique information includes information regarding a height, a weight, a body type, and a seating posture of the seated person, and in the decision step, the control device decides the driving amount of each of the ischial tuberosity support device, the sacrum/ilium support device, and the ninth thoracic vertebra support device based on the information regarding the height, the weight, the body type, and the seating posture of the seated person.

According to this aspect, the parameters can be set to correspond to the seating posture of the seated person.

More preferably, the physique information includes information regarding a height, a weight, a body type, and a seating posture of the seated person, and the control device acquires the information regarding the seating posture according to the internal pressure value of the air cell of each of the ischial tuberosity support device, the sacrum/ilium support device, and the ninth thoracic vertebra support device, and corrects the driving amount of each of the ischial tuberosity support device, the sacrum/ilium support device, and the ninth thoracic vertebra support device according to the corresponding internal pressure value.

According to this aspect, it is possible to acquire the posture of the seated person conveniently. Also, the parameters can be set to correspond to the seating posture of the seated person.

A vehicle (81) provided with the aforementioned vehicle seat and an armrest provided to be positioned on a side of the seated person, the vehicle comprising an armrest driving device (86) configured to change at least one of a vertical position of the armrest, a lateral position of the armrest, and an amount of protrusion of the armrest toward the seated person, wherein the control device is configured to decide, in the decision step, the position of the armrest based on the physique information acquired in the information acquisition step, and to control, in the output step, driving of the armrest driving device toward the position decided in the decision step.

According to this aspect, the armrest is automatically adjust such that the seated person assumes an appropriate seating posture and the arm of the seated person is placed at a position comfortable to the seated person. Thereby, the burden on the body of the seated person is reduced, whereby the fatigue of the seated person can be reduced.

Effect of the Invention

To achieve the above object, one aspect of the present invention provides a vehicle seat provided with a seat cushion and a seat back comprising: an ischial tuberosity support device configured to be driven to change a position of a part of the seat cushion corresponding to ischial tuberosities of a seated person; a sacrum/ilium support device configured to be driven to change a position of a part of the seat back corresponding to a sacrum and ilia of the seated person; a ninth thoracic vertebra support device configured to be driven to change a position of a part of the seat back corresponding to a ninth thoracic vertebra part of the seated person; and a control device configured to control driving of the ischial tuberosity support device, the sacrum/ilium support device, and the ninth thoracic vertebra support device, wherein the control device is configured to sequentially execute: an information acquisition step of acquiring physique information of the seated person; a decision step of deciding at least three parameters regarding respective driving amounts of the ischial tuberosity support device, the sacrum/ilium support device, and the ninth thoracic vertebra support device based on the physique information acquired in the information acquisition step to make each of the positions conform to a physique of the seated person; and an output step of driving the ischial tuberosity support device, the sacrum/ilium support device, and the ninth thoracic vertebra support device based on the corresponding parameters. According to this aspect, it is possible to control the posture of the seated person by moving the ischial tuberosities, the sacrum, the ilia, and the ninth thoracic vertebra part by changing each position, Thereby, the posture of the seated person can be controlled to achieve a posture that is less likely to induce fatigue. Also, since the amount of movement of the ischial tuberosities, the sacrum, the ilia, and the ninth thoracic vertebra part can be set in accordance of the physique of the seated person, it is possible to shift the posture of the seated person to an appropriate posture that matches the physique of the seated person and can reduce fatigue.

More preferably, each of the seat cushion and the seat back includes a pad member and a skin member covering a surface of the pad member, each of the ischial tuberosity support device, the sacrum/ilium support device, and the ninth thoracic vertebra support device includes an air cell disposed between the skin member and the pad member, a sensor configured to acquire an internal pressure value of the air cell, and an air supply and exhaust device configured to supply and exhaust air to and from the air cell to make the internal pressure value a prescribed pressure, and the driving amount of each of the ischial tuberosity support device, the sacrum/ilium support device, and the ninth thoracic vertebra support device is the internal pressure value of the corresponding air cell. According to this aspect, the positions of the respective parts of the seat cushion and the seat back can be changed easily.

More preferably, in the decision step, the control device decides the driving amounts of the ischial tuberosity support device, the sacrum/ilium support device, and the ninth thoracic vertebra support device so as to reproduce a shape of a back of a human body model in a neutral posture based on the physique information. According to this aspect, regardless of the physique of the seated person, it is possible to make the shape of the back achieve the shape in the neutral posture which satisfies the intervertebral disc neutral and the skeletal muscle neutral. Thereby, increase in the internal pressure of the intervertebral disc, tension of the skeletal muscles, load on the skin and the skeletal muscle system due to local pressure can be reduced, and hence, fatigue of the seated person can be reduced.

More preferably, the physique information includes information regarding a height and a weight of the seated person, and in the decision step, the control device decides the driving amount of each of the ischial tuberosity support device, the sacrum/ilium support device, and the ninth thoracic vertebra support device based on the information regarding the height and the weight of the seated person, According to this aspect, it is possible to decide the driving amounts such that the ischial tuberosities, the sacrum, the ilia, and the ninth thoracic vertebra part are positioned at appropriate positions matching the physique of the seated person.

More preferably, the vehicle seat includes a terminal configured to display information to the seated person based on a signal from the control device and to receive an input from the seated person to output the received input to the control device, the terminal being configured to display a reception area to receive an input or selection of the height and the weight from the seated person. According to this aspect, the physique information of the seated person can be acquired conveniently.

More preferably, the terminal determines a body type of the seated person based on the information regarding the height and the weight, and in the decision step, the control device decides the driving amount of each of the ischial tuberosity support device, the sacrum/ilium support device, and the ninth thoracic vertebra support device based on the height, the weight, and the determined body type. According to this aspect, it is possible to decide the driving amounts such that the ischial tuberosities, the sacrum, the ilia, and the ninth thoracic vertebra part are positioned at appropriate positions better matching the physique of the seated person. Also, the body type of the seated person is determined based on the height and the weight. Therefore, it is not necessary for the seated person to separately input the information regarding the body type, and it is possible to enhance the convenience compared to the case where the input is necessary.

More preferably, the physique information includes information regarding a height, a weight, and a body type of the seated person, and in the decision step, the control device decides the driving amount of each of the ischial tuberosity support device, the sacrum/ilium support device, and the ninth thoracic vertebra support device based on the information regarding the height, the weight, and the body type of the seated person. According to this aspect, it is possible to decide the driving amounts such that the ischial tuberosities, the sacrum, the ilia, and the ninth thoracic vertebra part are positioned at appropriate positions better matching the physique of the seated person.

More preferably, the vehicle seat includes a terminal configured to display information to the seated person based on the signal from the control device and to receive an input from the seated person to output the received input to the control device, the terminal being configured to display a reception area to receive an input or selection of the information regarding the height, the weight, and the body type of the seated person. According to this aspect, the physique information of the seated person can be acquired conveniently.

More preferably, the physique information includes information regarding a height, a weight, a body type, and a seating posture of the seated person, and in the decision step, the control device decides the driving amount of each of the ischial tuberosity support device, the sacrum/ilium support device, and the ninth thoracic vertebra support device based on the information regarding the height, the weight, the body type, and the seating posture of the seated person. According to this aspect, the driving amounts can be set to correspond to the seating posture of the seated person.

More preferably, the physique information includes information regarding a height, a weight, a body type, and a seating posture of the seated person, and the control device acquires the information regarding the seating posture according to the internal pressure value of the air cell of each of the ischial tuberosity support device, the sacrum/ilium support device, and the ninth thoracic vertebra support device, and corrects the driving amount of each of the ischial tuberosity support device, the sacrum/ilium support device, and the ninth thoracic vertebra support device according to the corresponding internal pressure value. According to this aspect, it is possible to acquire the posture of the seated person conveniently. Also, the driving amounts can be set to correspond to the seating posture of the seated person.

To achieve the above object, one aspect of the present invention provides a vehicle provided with the aforementioned vehicle seat and an armrest provided to be positioned on a side of the seated person, the vehicle comprising an armrest driving device configured to change at least one of a vertical position of the armrest, a lateral position of the armrest, and an amount of protrusion of the armrest toward the seated person, wherein the control device is configured to decide, in the decision step, the position of the armrest based on the physique information acquired in the information acquisition step, and to control, in the output step, driving of the armrest driving device toward the position decided in the decision step. According to this aspect, the armrest is automatically adjust such that the seated person assumes an appropriate seating posture and the arm of the seated person is placed at a position comfortable to the seated person. Thereby, the burden on the body of the seated person is reduced, whereby the fatigue of the seated person can be reduced.

BRIEF DESCRIPTION OF THE DRAWINGS

FIG. 4 is a diagram showing a table indicating the relationship between the physique of the seated person and the parameters for driving the driving devices;

FIG. 8 is an explanatory diagram for explaining transition of the screen of the terminal for setting driving of the vehicle seat according to the third embodiment;

FIG. 9 is a diagram showing a table indicating the relationship between the seating posture groups and the correction amounts of the parameters of the driving devices;

MODES(S) FOR CARRYING OUT THE INVENTION

In the following, an embodiment will be described with reference to the drawings, in which the present wend on is applied to a vehicle seat to be installed in an automobile.

Figure 1:
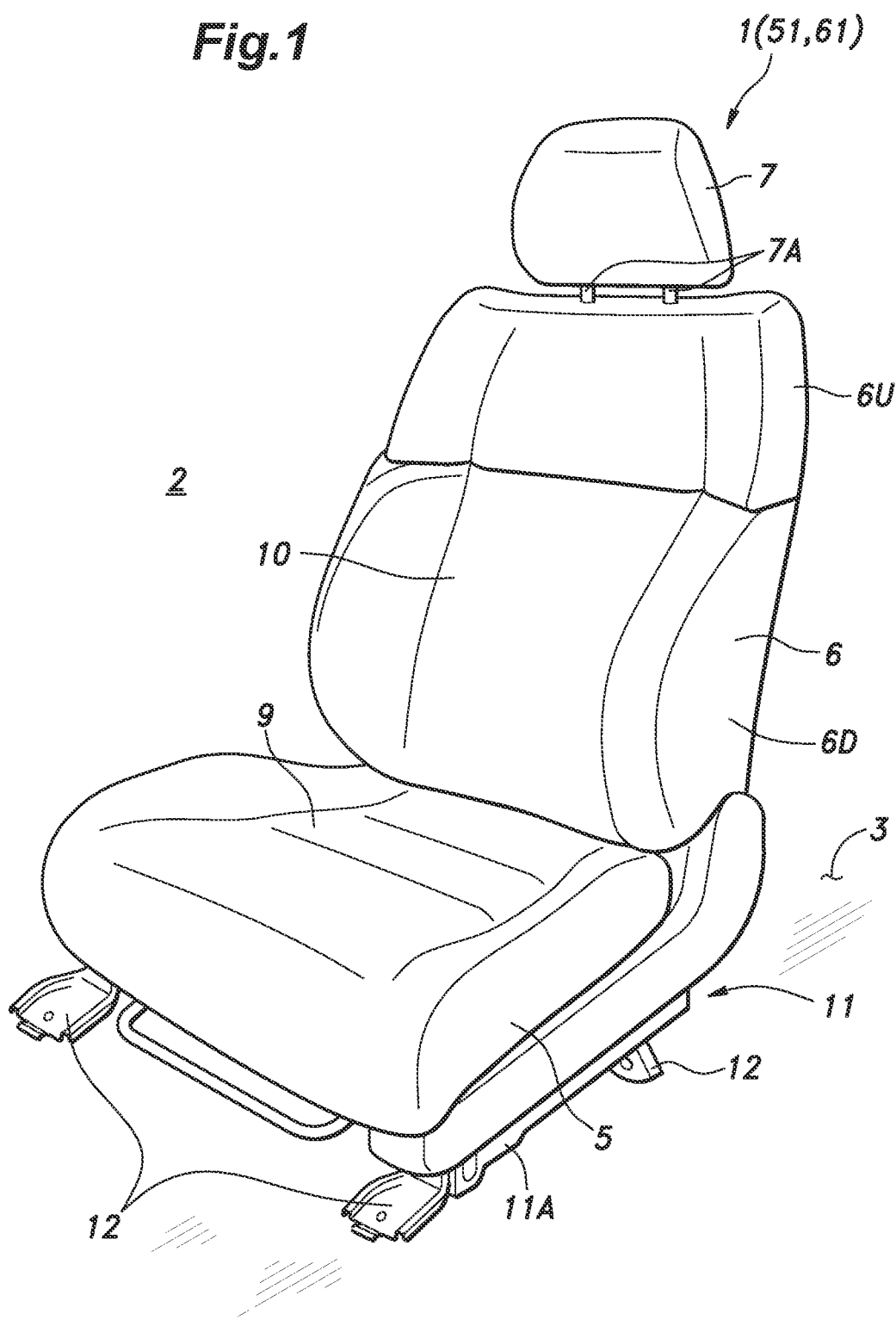
FIG. 1 is a perspective view of a vehicle seat according to the first embodiment, the second embodiment, and the third embodiment of the present invention.

As shown in FIG. 1, a vehicle seat 1 according to the present invention is placed on a floor 3 which defines a bottom portion of a cabin 2. The vehicle seat 1 constitutes a front passenger seat provided on the side of the driver's seat. In the following, description will be made with the front-rear, left-right, and up-down directions being defined with respect to a direction viewed from an occupant seated in the vehicle seat 1 (hereinafter, a seated person).

The vehicle seat 1 is arranged on an upper surface of the floor 3 to face in the forward direction of the vehicle (more specifically, such that the seated person faces in the forward direction of the vehicle). The vehicle seat 1 is provided with a seat cushion 5 for supporting the buttocks of the seated person, a seat back 6 provided on a rear portion of the seat cushion 5 to function as a backrest, and a headrest 7 provided on an upper portion of the seat hack 6.

Figure 2:
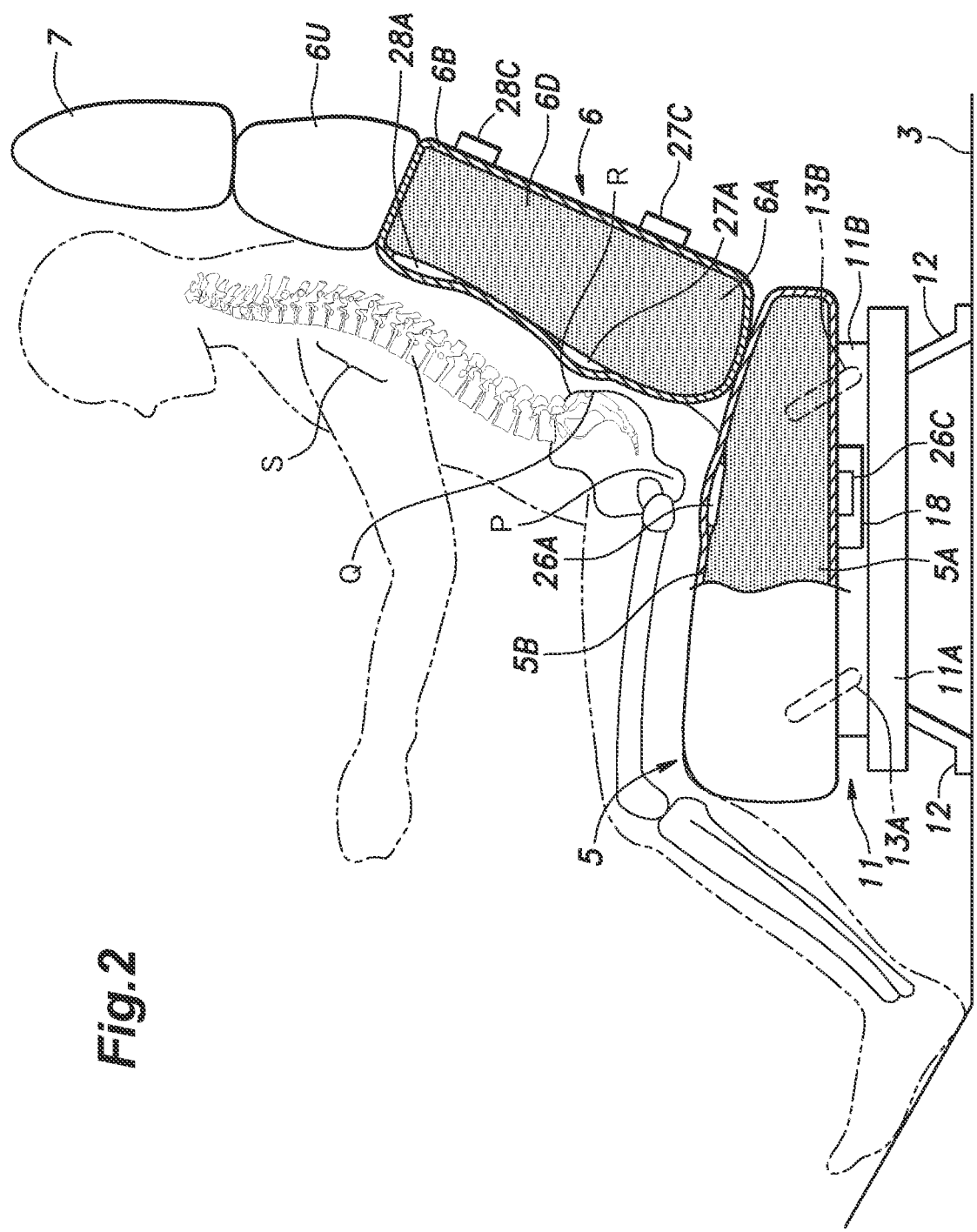
FIG. 2 is an explanatory diagram for explaining the relationship of the skeleton of the seated person with the seat cushion and the seat back.

The seat cushion 5 is in a substantially rectangular parallelepiped shape having a surface facing substantially in the vertical direction. The seat cushion 5 includes a frame serving as a skeleton (not shown in the drawings), a pad member 5A (see FIG. 2) supported by the frame, and a skin member 5B covering the surface of the pad member 5A. An upper surface of the seat cushion 5 constitutes a seating surface 9 for one person. The seating surface 9 is depressed downward substantially at the center with respect to the lateral direction and is inclined slightly downward toward the rear. FIG. 2 shows the vehicle seat 1 and a skeleton of a person having a standard physique and seated in the vehicle seat 1. As shown in FIG. 2, the buttocks and the thighs of the seated person are placed on the seating surface 9, and the seating surface 9 is shaped to conform to the buttocks and the thighs of the seated person.

As shown in FIG. 2, the seat cushion 5 is joined to the floor 3 via a slide device 11. The slide device 11 includes a pair of left and right lower rails 11A extending in the fore and aft direction and a pair of left and right upper rails 11B joined to the lower rails 11A to be slidably movable along the respective extension directions. Each lower rail 11A is fastened to the floor 3 at the front end and the rear end thereof via seat legs 12. With the upper rails 11B sliding relative to the lower rails 11A, the seat cushion 5 moves in the fore and aft direction relative to the floor 3.

A front portion of the frame constituting the seat cushion 5 is connected with a front portion of each upper rail 11B via a front link 13A, and a rear portion of the frame constituting the seat cushion 5 is connected with a rear portion of each upper rail 11B via a rear link 13B. Each of the front link 13A and the rear link 13B is connected to the seat cushion 5 at an upper end thereof to be rotatable about an axis extending in the lateral direction, and is connected to the upper rail 11B at a lower end thereof to be rotatable about an axis extending in the lateral direction. By rotating the front link 13A with the lower end being the center, the seating surface 9 of the seat cushion 5 is inclined relative to the floor 3. By rotating each of the front link 13A and the rear link 13B with the lower end being the center, the seating surface 9 of the seat cushion 5 is moved up and down relative to the floor 3.

As shown in FIG. 1, the seat back 6 extends vertically and forms a substantially rectangular parallelepiped shape having a surface facing substantially in the fore and aft direction. The seat back 6 includes a frame serving as a skeleton (not shown in the drawings), a pad member 6A (see FIG. 2) supported by the frame, and a skin member 6B covering the surface of the pad member 6A. The front surface of the seat back 6 forms a support surface 10 for supporting the back of the seated person. The support surface 10 is recessed rearward substantially at a laterally central part thereof, and is slightly inclined rearward toward the upper end thereof. The support surface 10 has a shape conformal to the back of the seated person, and the back of the seated person is supported by the support surface 10. The lower end of the seat back 6 is connected to the rear end of the seat cushion 5 to be pivotable about a laterally extending axis. In the following, the rotation angle of the seat cushion 5 relative to the seat back 6 will be referred to as a reclining angle.

In the present embodiment, the seat back 6 includes a lower seat back 617 provided to be capable of pivoting (tilting) relative to the seat cushion 5 and an upper seat back 6U provided to be capable of pivoting (tilting) relative to the lower seat back 61). The upper seat back 6U can tilt forward from a position where the front surface thereof is continuous with that of the lower seat back 6D. In the following, the pivoting angle of the upper seat back 6U relative to the lower seat back 6D will be referred to as a middle fold angle.

The headrest 7 is connected to the upper end of the seat back 6 via a pillar 7A. The headrest 7 is disposed at a position behind the head of the seated person.

In the present embodiment, the headrest 7 is connected to be capable of moving up and down within a prescribed range on an upper side of a reference position of the headrest 7 with respect to the seat back 6 (the position where the headrest 7 comes into contact with the seat back 6). In the following, the amount of upward movement of the headrest 7 from the reference position will be referred to as a headrest lift amount.

The vehicle seat 1 is provided with a fatigue reduction system 15 for inducing an appropriate posture of the seated person and reducing fatigue of the seated person.

Figure 3:
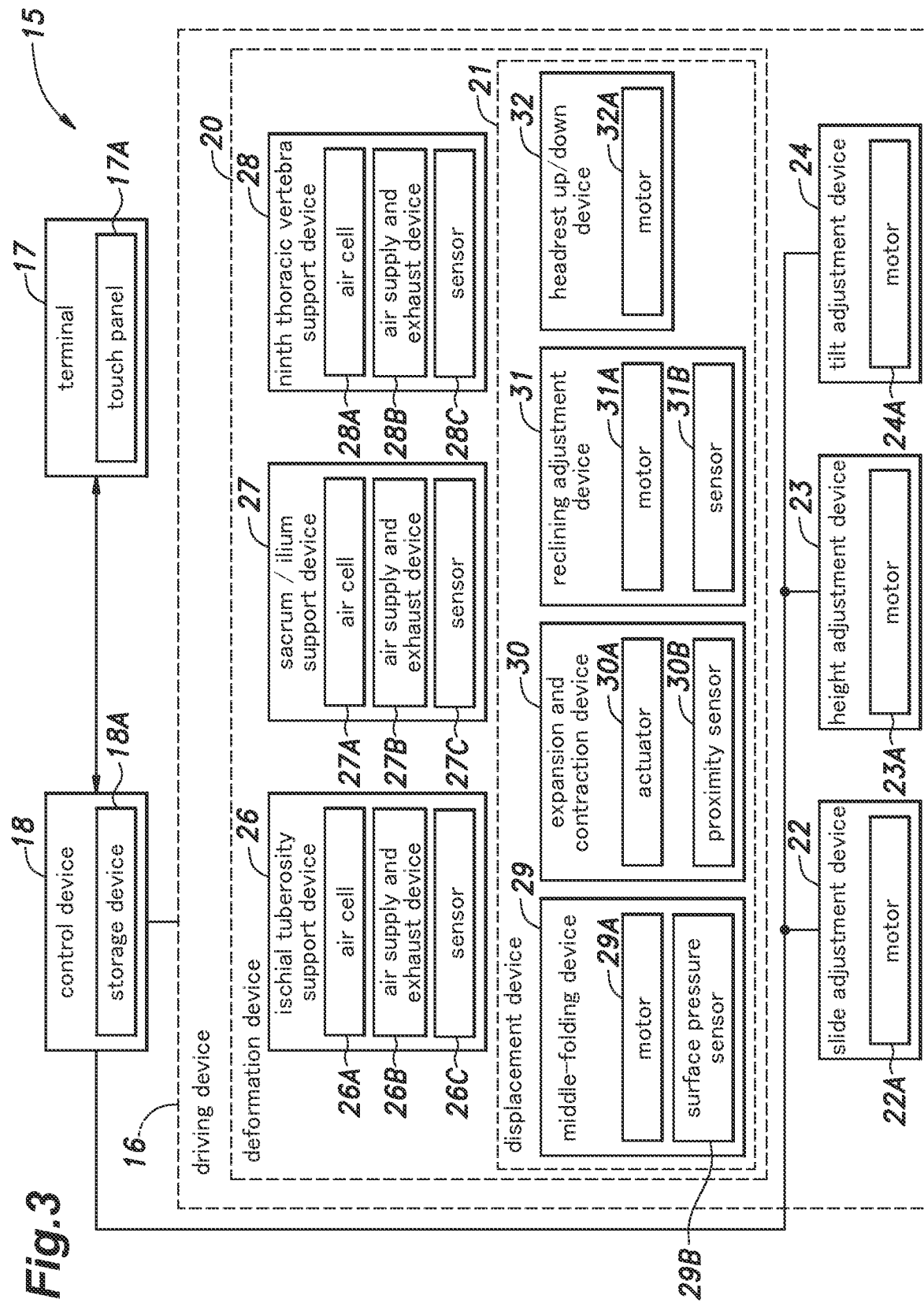
FIG. 3 is a functional block diagram of the vehicle seat according to the present invention.

As shown in FIG. 3, the fatigue reduction system 15 is provided with driving devices 16 for changing the position and/or shape of the vehicle seat 1, a terminal 17 for receiving an input from the seated person and displaying information to the seated person, and a control device 18 for controlling the driving devices 16 based on the input from the terminal 17.

The driving devices 16 include deformation devices 20 for changing the shape of the seating surface 9 or the support surface 10. In the present embodiment, the deformation devices 20 include displacement devices 21 for changing relative positions of various parts of the seat back 6 such as the seat cushion 5, the seat back 6, the headrest, etc. In the present embodiment, the driving devices 16 further include a slide adjustment device 22 for slidably moving the vehicle seat 1 relative to the floor 3, a height adjustment device 23 for changing the height of the seat cushion 5, and a tilt adjustment device 24 for rotating the seat cushion 5.

The deformation devices 20 include an ischial tuberosity support device 26 for supporting the ischial tuberosities P (see FIG. 2) of the seated person, a sacrum/ilium support device 27 for supporting the sacrum Q and the ilia. R of the seated person, and a ninth thoracic vertebra support device 28 for supporting the ninth thoracic vertebra part S of the seated person. In the present embodiment, the deformation devices 20 further include a middle-folding device 29 for changing the middle fold angle of the seat back 6, an expansion and contraction device 30 for changing the fore and aft length the seat cushion 5, a reclining adjustment device 31 for tilting the seat back 6 relative to the seat cushion 5 to change the reclining angle, and a headrest up/down device 32 for moving the headrest 7 up and down relative to the seat back 6 to change the headrest lift amount.

The ischial tuberosity support device 26 includes an air cell 26A provided between the skin member 5B and the pad member 5A of the seat cushion 5, an air supply and exhaust device 26B for supplying and discharging air to and from an interior of the air cell 26A, and a sensor 26C for acquiring the air pressure in the air cell 26A (namely, internal pressure value). The air cell 26A of the ischial tuberosity support device 26 is positioned in a rear portion of the seat cushion 5. When air is supplied to the interior of the air cell 26A by the air supply and exhaust device 26B and the internal pressure value thereof increases, the air cell 26A expands to make a part of the seat cushion 5 in contact with the ischial tuberosities P of the seated person protrude upward. Namely, the internal pressure value of the air cell 26A corresponds to the driving amount of the air supply and exhaust device 26B. Due to the expansion of the air cell 26A, the part of the seat cushion 5 in contact with the ischial tuberosities P is brought to a prescribed position determined by the internal pressure of the air cell 26A regardless of the load from the seated person. Thereby, the ischial tuberosities P of the seated person also are moved upward to the prescribed position while being supported from below by the air cell 26A, When air is exhausted from the interior of the air cell 26A, the air cell 26A contracts and the ischial tuberosities P of the seated person are moved downward. The air supply and exhaust device 26B and the sensor 26C included in the ischial tuberosity support device 26 are each connected with the control device 18.

The sacrum/ilium support device 27 includes an air cell 27A provided between the skin member 6B and the pad member 6A of the seat back 6, an air supply and exhaust device 27B for supplying and discharging air to and from an interior of the air cell 27A, and a sensor 27C for acquiring the air pressure in the air cell 27A (namely, internal pressure value). The air cell 27A of the sacrum/ilium support device 27 is positioned in a lower portion of the seat back 6. When air is supplied to the interior of the air cell 27A by the air supply and exhaust device 27B and the internal pressure value thereof increases, the air cell 27A expands to make a part of the seat back 6 in contact with the sacrum Q and the ilia R of the seated person protrude forward. Namely, the internal pressure value of the air cell 27A corresponds to the driving amount of the air supply and exhaust device 27B. Due to the expansion of the air cell 27A, the part of the seat back 6 in contact with the sacrum Q and the ilia R is brought to a prescribed position determined by the internal pressure value of the air cell 27A regardless of the load from the seated person. The sacrum Q and the ilia R of the seated person also are moved forward to the prescribed position while being supported from the rear by the air cell 27A. Thereby, the sacrum Q and the ilia R of the seated person are moved forward to the prescribed position while being supported from the rear by the air cell 27A. When air is exhausted from the interior of the air cell 27A, the air cell 27A contracts and the sacrum Q and the ilia R of the seated person are moved rearward. The air supply and exhaust device 27B and the sensor 27C of the sacrum/ilium support device 27 are each connected with the control device 18.

The ninth thoracic vertebra support device 28 includes an air cell 28A provided between the skin member 6B and the pad member 6A of the seat back 6, an air supply and exhaust device 28B for supplying and discharging air to and from an interior of the air cell 28A, and a sensor 28C for acquiring the air pressure in the air cell 28A (namely, internal pressure value). The air cell 28A of the ninth thoracic vertebra support device 28 is positioned in a substantially central part of the seat back 6. When air is supplied to the interior of the air cell 28A by the air supply and exhaust device 28B, the air cell 28A expands to make a part of the seat back 6 in contact with the ninth thoracic vertebra part S of the seated person protrude forward, Namely, the internal pressure value of the air cell 28A corresponds to the driving amount of the air supply and exhaust device 28B. Due to the expansion of the air cell 28A, a part of the seat cushion 5 in contact with the ninth thoracic vertebra part S is brought to a prescribed position determined by the internal pressure value of the air cell 28A regardless of the load from the seated person. The ninth thoracic vertebra part S of the seated person also is moved forward to the prescribed position while being supported from the rear by the air cell 28A, Thereby, the ninth thoracic vertebra part S of the seated person is moved forward to the prescribed position while being supported from the rear by the air cell 28A. When air is exhausted from the interior of the air cell 28A, the air cell 28A contracts and the ninth thoracic vertebra part S of the seated person is moved rearward. The air supply and exhaust device 28B and the sensor 28C included in the ninth thoracic vertebra support device 28 are each connected with the control device 18. It is to be noted that the ninth thoracic vertebra part S here means a part located at the position of the center of gravity of the upper body and including the ninth thoracic vertebra of the seated person, namely, a part of the spine that does not move easily.

The middle-folding device 29 includes a motor 29A for pivoting the upper seat back 6U relative to the lower seat back 6D and a surface pressure sensor 29B provided on an upper portion of the front surface the upper seat back 6U. The surface pressure sensor 29B detects a surface pressure that is applied to the upper end of the front surface of the seat back 6. When the upper seat back 6U pivots relative to the lower seat back 6D and the upper end of the upper seat back 6U comes into contact with the back of the seated person, the surface pressure detected by the surface pressure sensor 29B increases. The motor 29A and the surface pressure sensor 29B of the middle-folding device 29 are each connected with the control device 18.

The expansion and contraction device 30 includes an actuator 30A provided in the seat cushion 5 to make the front end of the seat cushion 5 protrude forward and a proximity sensor 30B provided on the front surface of the seat cushion 5. The proximity sensor 30B detects closeness and/or contact to a leg of the seated person. For example, the proximity sensor 30B may be a pressure sensor that detects the pressure applied from the rear surface of the leg of the seated person to the front surface of the seat cushion 5 or an infrared sensor that measures the distance between the leg and the front surface of the seat cushion 5. The actuator 30A may be provided in the seat cushion 5, and in the case where the seat cushion 5 includes a rear cushion constituting the rear portion thereof and a front cushion constituting the front portion thereof such that the front cushion is slidable relative to the rear cushion, may be a motor for causing the front cushion to slide.

The reclining adjustment device 31 includes a motor 31A for rotating the seat back 6 relative to the seat cushion 5 and a sensor 31B for detecting the reclining angle. The motor 31A and the sensor 31B included in the reclining adjustment device 31 are each connected with the control device 18.

The headrest up/down device 32 includes a motor 32A for moving the headrest 7 up and down relative to the seat back 6 by moving the pillar 7A joined to the seat back 6. The motor 32A is connected to the control device 18, and the driving of the motor 32A is controlled by the control device 18.

The slide adjustment device 22 includes a motor 22A for causing the upper rails 11B to slide relative to the lower rails 11A. The motor 22A is connected to the control device 18, and the driving of the motor 22A is controlled by the control device 18.

The height adjustment device 23 includes a motor 23A for moving the seat cushion 5 up and down by causing each of the front link 13A and the rear link 13B to pivot. The driving of the motor 23A causes the seat cushion 5, the seat back 6, and the headrest 7 to move up and down integrally. The motor 23A is connected to the control device 18, and the driving of the motor 23A is controlled by the control device 18. In the following, the amount of rise of the seat cushion 5 from a prescribed position due to the driving of the motor 23A will be referred to as a height amount.

The tilt adjustment device 24 includes a motor 24A for causing the front link 13A to pivot to make the seat cushion 5 rotate with the rear portion thereof being an axis and to thereby move the front portion up and down relative to the rear portion. The motor 24A is connected to the control device 18, and the driving of the motor 24A is controlled by the control device 18. In the following, the rotation angle of the seat cushion 5 due to the driving of the motor 24A will be referred to as a tilt angle.

The terminal 17 is a smartphone or a tablet computer, which is provided with a touch panel 17A, and conducts near field communication with the control device 18, The terminal 17 executes a prescribed application thereby to perform a reception process of receiving input of information regarding the physique of the seated person including the height and the weight (hereinafter, physique information) and transmitting an input completion signal including the physique information to the control device 18.

The control device 18 is a computer including a central processing unit (CPU) and a storage device 18A such as a ROM, a RAM, a rewritable nonvolatile memory, a hard disk, etc. In the present embodiment, the control device 18 is fixed to the lower surface of the seat cushion 5. The storage device 18A stores a table (hereinafter, a driving table) indicating the relationship between the physique of the seated person and the parameters regarding the driving amount for driving the driving devices 16 to adapt the vehicle seat 1 to each physique. The parameters are defined beforehand to reproduce the shape of the back of the human body model in the neutral posture based on the corresponding physique. Note that the neutral posture here refers to the posture that satisfies the intervertebral disc neutral and the skeletal muscle neutral.

As shown in FIG. 4, the driving table records the relationship of a height range, a weight range, and a number of a group indicating a body type (for example, thin, standard, plump, etc. In the following, the body type group) with the parameters of the driving devices 16 for a seated person belonging to the group of the number and having a typical physique in the group. The parameters of the driving devices 16 include various parameters of the deformation devices 20, a slide amount which is a parameter of the slide adjustment device 22, the height amount which is a parameter of the height adjustment device 23, and the tilt angle which is a parameter of the tilt adjustment device 24. The parameters of the deformation devices 20 include the internal pressure value of the air cell 26A of the ischial tuberosity support device 26, the internal pressure value of the air cell 27A of the sacrum/ilium support device 27, the internal pressure value of the air cell 28A of the ninth thoracic vertebra support device 28, the middle fold angle which is a parameter of the middle-folding device 29, the expansion/contraction amount of the seat cushion 5 which is a parameter of the expansion and contraction device 30, and the headrest lift amount which is a parameter of the headrest up/down device 32. The parameters of the ischial tuberosity support device 26, the sacrum/ilium support device 27, and the ninth thoracic vertebra support device 28 are each defined to achieve the positions in the neutral posture of the ischial tuberosities P, the sacrum Q, the ilia R, and the ninth thoracic vertebra part S of a typical seated person belonging to the corresponding group. Upon receipt of the input completion signal, the control device 18 performs a seat adjustment process by controlling the driving devices 16 based on the physique information.

In the following, first, the reception process performed in the terminal 17 will be described in detail, and thereafter, the seat adjustment process performed by the control device 18 will be described.

The terminal 17 starts the reception process when there is a prescribed input to the touch panel 17A. In the reception process, first, a reception area 40 for receiving input of height and weight, respectively, from the seated person are displayed as input fields 40A. At this time, the terminal 17 displays a button written "Next" on it (hereinafter, a proceed button 41) on the touch panel 17A together with the input fields 40A (see FIG. 5(A)). When the input has not been completed or the proceed button 41 has not been pressed, the terminal 17 waits until the input is completed and the proceed button 41 is pressed.

Figure 5:
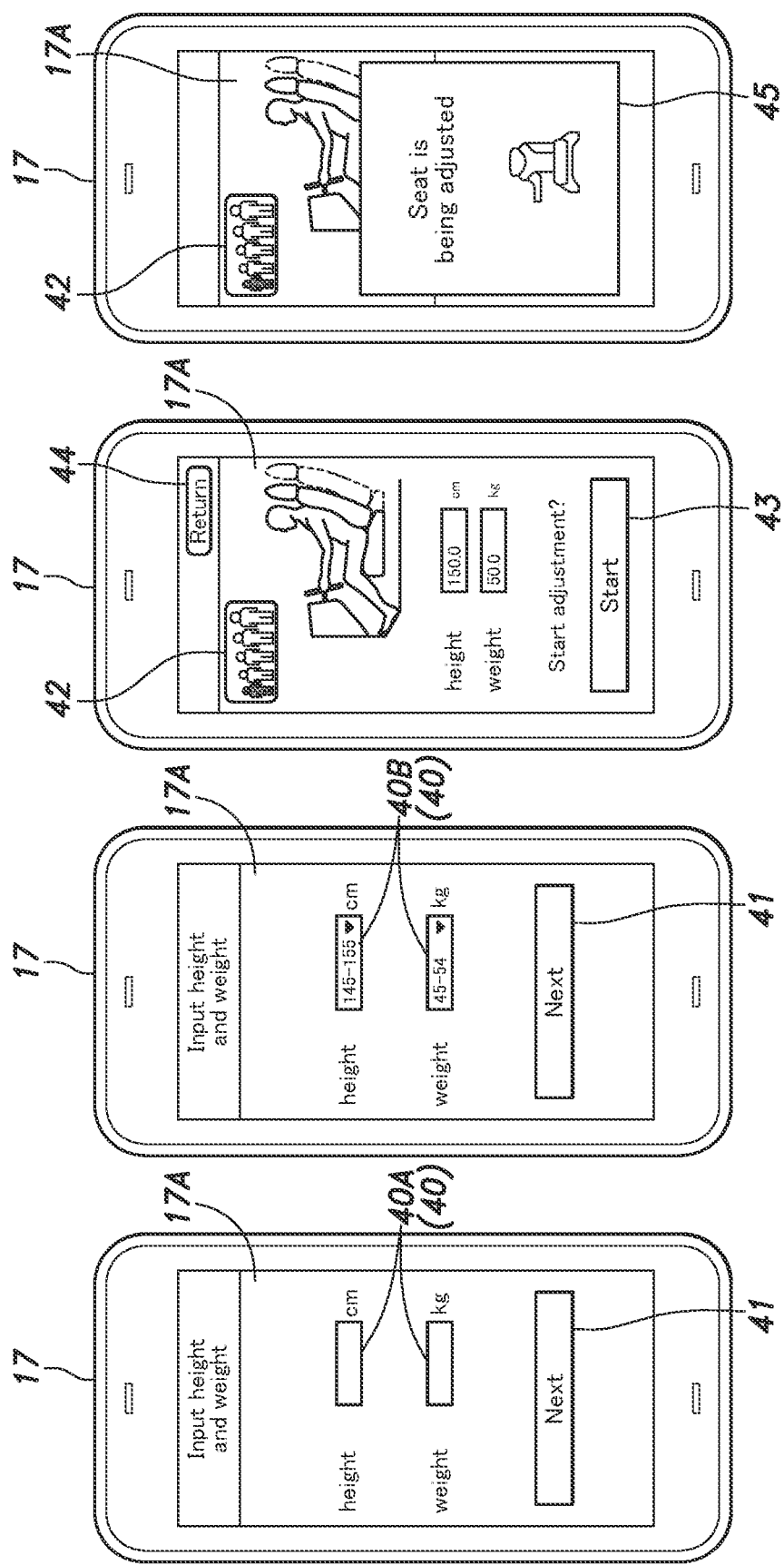
FIG. 5 is an explanatory diagram for explaining an input screen of a terminal for setting driving of the vehicle seat according to the first embodiment.

It is to be noted that the reception area 40 displayed on the terminal 17 does not have to be configured to directly receive the input of the height and the weight, and the reception area 40 may be configured to have the seated person select a range to which the height of the seated person belongs and a range to which the weight of the seated person belongs and to receive the selection made by the seated person (namely, a pulldown type) (see FIG. 5(B)).

When the input is completed and the proceed button 41 is pressed, the terminal 17 determines the body type group to which the seated person belongs by using the height and the weight received at the reception area 40. In the present embodiment, the terminal 17 calculate a BMI value by using the height and the weight. Thereafter, based on the BMI value, the terminal 17 determines the body type group to which the body type of the seated person belongs. In the present embodiment, the terminal 17 determines that the body type is thin when the BMI value of the seated person is less than 22, standard when the BMI value is equal to or greater than 22 and less than 30, and plump when the BMI value is equal to or greater than 30.

When the determination of the body type group is completed, the terminal 17 displays, on the touch panel 17A, the, height, the weight, a symbol 42 indicating the body type group, a start button 43, and a button written "Return" on it (hereinafter, a return button 44) (see FIG. 5(C)). When the start button 43 is pressed, the terminal 17 transmits an input completion signal including the three pieces of information, namely, the height, the weight, and the body type group (hereinafter, the physique information) to the control device 18. Thereafter, the terminal 17 displays a pop up screen 45 indicating that the seat adjustment is started (see FIG. 5(D)) and ends the reception process. When the return button 44 is pressed, the terminal 17 displays the reception area 40 on the touch panel 17A to receive the input of the height and the weight from the seated person again.

Figure 6:
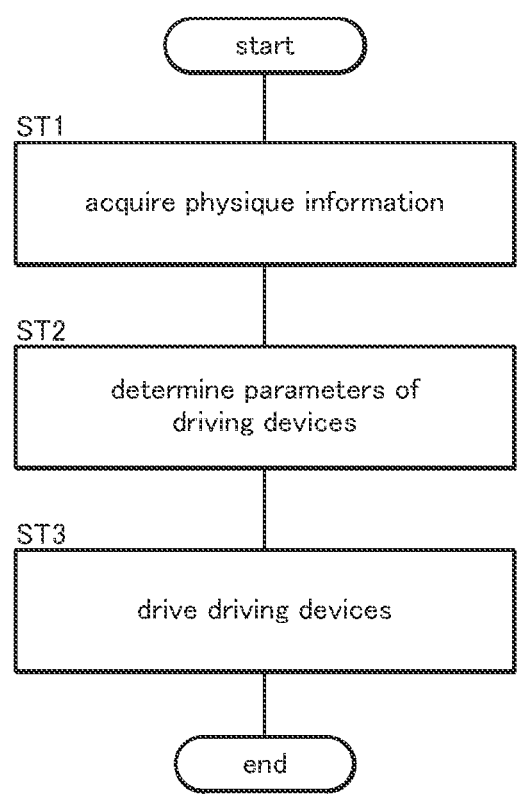
FIG. 6 is a flowchart of a seat adjustment process.

Upon receipt of the input completion signal, the control device 18 performs the seat adjustment process shown in the flowchart of FIG. 6. In the first step ST1 (information acquisition step) of the seat adjustment process, the control device 18 acquires the physique information included in the input completion signal, namely, the three pieces of information consisting of the height, the weight, and the body type group of the seated person. When the acquisition of the physique information is completed, the control device 18 executes step ST2.

In step ST2 (decision step), the control device 18 decides the various parameters for driving the driving devices 16 based on the acquired physique information. More specifically, the control device 18 refers to a table held in the storage device 18A and acquires the number of the group that matches the acquired physique information. Thereafter, the control device 18 refers to the table and acquires the parameters of the driving devices 16 corresponding to the acquired group, and decides the respective acquired parameters as the parameters for driving the driving devices 16. The parameters of the driving devices 16 that are acquired include the internal pressure value of the air cell 26A of the ischial tuberosity support device 26, the internal pressure value of the air cell 27A of the sacrum/ilium support device 27, and the internal pressure value of the air cell 28A of the ninth thoracic vertebra support device 28.

In step ST3 (output step), based on the parameters of the driving devices 16 acquired in step ST2, the control device 18 drives the corresponding driving devices 16. Thereby, the slide adjustment device 22, the height adjustment device 23, the tilt adjustment device 24, the middle-folding device 29, the expansion and contraction device 30, the reclining adjustment device 31, the headrest up/down device 32, the ischial tuberosity support device 26, the sacrum/ilium support device 27, and the ninth thoracic vertebra support device 28 are driven in accordance with the respective set parameters. Due to the driving of the ischial tuberosity support device 26, the sacrum/ilium support device 27, and the ninth thoracic vertebra support device 28, the position of the part of the seat cushion 5 corresponding to the ischial tuberosities P of the seated person, the position of the part of the seat back 6 corresponding to the sacrum Q and the ilia R, the position of the part of the seat back 6 corresponding to the ninth thoracic vertebra part S are each controlled to reproduce the shape of the back of the human body model in the neutral posture based on the physique information. When the driving of each driving device 16 is completed, the control device 18 ends the seat adjustment process.

Next, effects of the vehicle seat 1 configured as above will be discussed. The position of the part of the seat cushion 5 corresponding to the ischial tuberosities P of the seated person, the position of the part of the seat back 6 corresponding to the sacrum Q and the ilia R, the position of the part of the seat back 6 corresponding to the ninth thoracic vertebra part S are each controlled to reproduce the shape of the back of the human body model in the neutral posture based on the physique information. Thereby, the ischia, the sacrum Q, the ilia R, and the ninth thoracic vertebra part S of the sealed person are each moved so that the seated person takes the neutral posture. At this time, the body of the seated person is in a relaxed state, and therefore, it is possible to reduce fatigue of the seated person resulting from tension of the skeletal muscles.

The vehicle seat 1 has the air cells 26A, 27A, 28A built therein at positions appropriate to move the ischial tuberosities P where the pain load is high in the lower body, the sacrum Q and the ilia R which are a rigid body in the skeleton structure, and the ninth thoracic vertebra part S which is the position of the center of gravity of the upper body and is most unlikely to move in the spine. Thereby, without increasing the internal pressure of the intervertebral disc, it is possible to effectively reduce fatigue caused by increase in the internal pressure of the intervertebral disc, tension of the skeletal muscles, load on the skin and the skeletal muscle system due to local pressure, and extended seating time.

Also, the position of the part of the seat cushion 5 corresponding to the ischial tuberosities P of the seated person, the position of the part of the seat back 6 corresponding to the sacrum Q and the ilia R, the position of the part of the seat back 6 corresponding to the ninth thoracic vertebra part S are each defined in accordance with the human body model based on the physique information of the seated person. Thereby, the positions of the various parts of the seat cushion 5 and the seat back 6 are set such that the ischial tuberosities P, the sacrum Q, the ilia R, and the ninth thoracic vertebra part S are positioned at appropriate positions matching the physique of the seated person. Thereby, regardless of the physique of the seated person, the seated person can be put in a state in which the body is relaxed.

Thus, regardless of the physique, the fatigue of the seated person can be reduced effectively.

The information regarding the body type of the seated person is acquired by calculating the BMI value using the height and the weight input to the reception area 40 displayed on the touch panel 17A. Thereby, the information regarding the body type of the seated person can be acquired without need for a sensor for measuring the body type of the seated person. Thus, the physique information including the height, the weight, and the body type of the seated person can be acquired conveniently.

In ride share, car share or the like, in which vehicles are shared, the vehicle seat 1 installed in each vehicle has varying shapes. It is not easy to set the deformation amount of each vehicle seat to match the physique of the seated person. In the present embodiment, the deformation amount matching the physique of the seated person can be set by revising the table stored in the storage device 18A to set the parameters of the driving devices 16 matching the shape of the vehicle seat 1.

Second Embodiment

A vehicle seat 51 according to the second embodiment differs from the vehicle seat 1 according to the first embodiment with regard to the reception process, and the other configuration is the same and thus the description thereof will be omitted.

Figure 7:
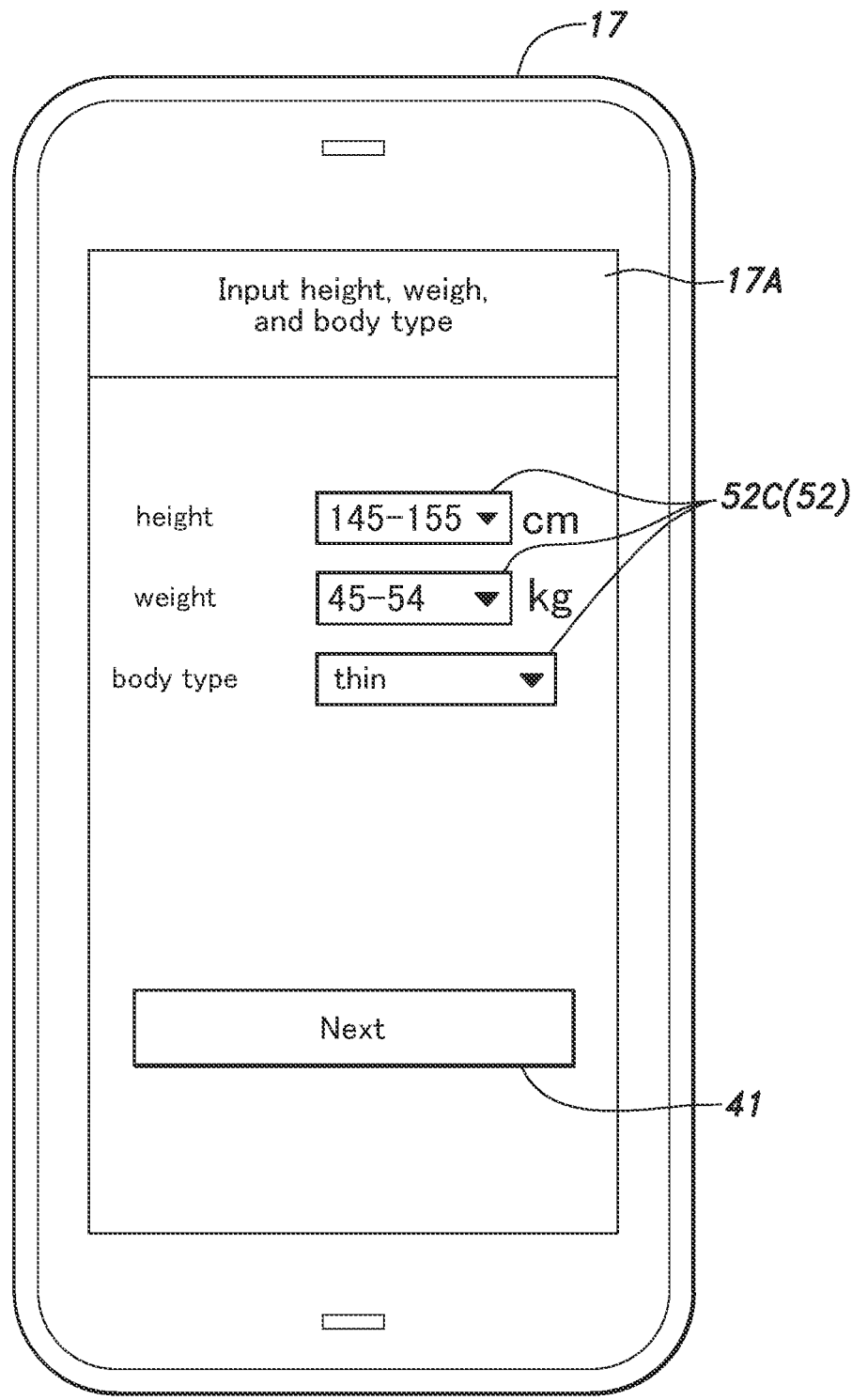
FIG. 7 is an explanatory diagram for explaining the screen of the terminal for setting driving of the vehicle seat according to the second embodiment.

As with the first embodiment, the terminal 17 starts the reception process when there is a prescribed input to the touch panel 17A. In the reception process, the terminal 17 displays a reception area 52 for receiving input of the height, the weight, and the corresponding body type group from the seated person. In this embodiment, the terminal 17 may display the reception area 52 as selection fields 52C (pull-down lists) enabling the seated person to select the range to which the height belongs, the range to which the weight belongs, and the body type group to which the seated person considers he/she belongs (see FIG. 7). Also, as with the first embodiment, the terminal 17 displays the proceed button 41 on the touch panel 17A together with the reception area 52, and when the input has not been completed or the proceed button 41 has not been pressed, waits until the input is completed and the proceed button 41 is pressed.

The reception area 52 displayed in the reception process is not limited to the one enabling selection of the range to which the height belongs, the range to which the weight belongs, and the body type group, and may include input fields for directly receiving input from the seated person, for example.

When the input is completed and the proceed button 41 is pressed, the terminal 17 displays the range to which the height belongs, the range to which the weight belongs, and the body type group (namely, the physique information) together with the start button 43 and the return button 44, When the start button 43 is pressed, the terminal 17 transmits the input completion signal including the input physique information to the control device 18. Thereafter, the terminal 17 displays a screen notifying that the seat adjustment is started, and ends the reception process. When the return button 44 is pressed, the terminal 17 displays the reception area 52 on the touch panel 17A as shown in FIG. 7, and receives again the selection of the range to which the height belongs, the range to which the weight belongs, and the body type group to which the seated person considers he/she belongs.

Next, effects of the vehicle seat 51 configured as above will be discussed. In this embodiment, since the input of the body type group is directly received from the seated person, the physique information of the seated person can be acquired conveniently without performing calculation of BMI.

Third Embodiment

A vehicle seat 61 according to the third embodiment differs from the first embodiment in that the terminal 17 displays, in the reception process, a reception area. 40 for receiving input of the information regarding the seating posture in addition to the height and the weight. Also, the third embodiment differs from the first embodiment in that the storage device 18A stores a correction table in addition to the table same as in the first embodiment. Furthermore, the third embodiment differs from the first embodiment in that the control device 18 calculates the various parameters of the driving devices 16 based on the information regarding the seating posture in addition to the information regarding the height, the weight, and the body type, namely, step ST3 differs. In the following, details of the reception process, configuration of table stored in the storage device 18A, and step ST3 of the seat adjustment process will be described in order.

As with the first embodiment, the terminal 17 starts the reception process when there is a prescribed input to the touch panel 17A In the reception process, the terminal 17 displays a reception area 62 as a height input field 62A, a weight input field 62B, and a selection field 62C for receiving a group of seating posture (hereinafter, a seating posture group) to which the seated person considers he/she belongs (see FIG. 8(A)). In this embodiment, the seating posture groups consist of five groups; namely, arched back, slight arched back, normal, slight sway back, and sway back. The seating posture group selection field 62C displayed by the terminal 17 is preferably formed of a pulldown list. As with the first embodiment, the terminal 17 displays the proceed button 41 on the touch panel 17A together with the reception area 62, and when input has not been completed or the proceed button 41 has not been pressed, waits until the input is completed and the proceed button 41 is pressed.

When the input is completed and the proceed button 41 is pressed, as with the first embodiment, the terminal 17 calculates the BMI value by using the height and the weight input to the reception area 62, and calculates the body type group to which the seated person belongs.

When the calculation is completed, the terminal 17 displays the height and the weight, a symbol 42 indicating the body type group to which the seated person belongs, a FIG. 63 indicating the seating posture, and the start button 43 and the return button 44 (see FIG. 8(B)). When the start button 43 is pressed, the terminal 17 transmits the input completion signal including the four pieces of information consisting of the height, the weight, the body type group to which the seated person belongs, and the seating posture group (hereinafter, the physique information) to the control device 18. Thereafter, the terminal 17 performs a screen display (see FIG. 8(C)) and ends the reception process. When the return button 44 is pressed, the terminal 17 displays the reception area 62 on the touch panel 17A and receives again the input of the height and the weight and the selection of the seating posture group from the seated person.

Next, the configuration of the correction table stored in the storage device 18A will be described. As shown in FIG. 9, the correction table is a table showing the relationship between the seating posture group and the correction amount of the parameter of each driving device 16. The correction amounts are set corresponding to the seating postures of the respective seating posture groups, and in the present embodiment, the correction amounts are set to correct the seating posture into an appropriate posture. More specifically, when the seating posture group is "arched back," the parameters of the driving devices 16 are set to correct the arched back posture (for example, to make the air cell 28A of the ninth thoracic vertebra support device 28 protrude forward).

Next, step ST2 and step ST3 of the seat adjustment process will be described. As with the first embodiment, the control device 18 decides the various parameters for driving the driving devices 16 based on the acquired physique information. More specifically, the control device 18 refers to the table held in the storage device 18A to acquire the number of group matching the acquired physique information. Thereafter, the control device 18 refers to the table to acquire the parameters of the driving devices 16 corresponding to the acquired group number and decides the acquired parameters as the parameters for driving the driving devices 16.

Further, in step ST3, the control device 18 corrects the acquired parameters of the driving devices 16 by referring to the correction table. More specifically, the control device 18 acquires the correction amount for each driving device 16 by referring to the correction table by using the seating posture group to which the seated person belongs. Subsequently, the control device 18 corrects the driving parameters by using the acquired correction amounts. Thereby, the parameters of the driving devices 16; for example, the internal pressure value of the air cell 26A of the ischial tuberosity support device 26, the internal pressure value of the air cell 27A of the sacrum/ilium support device 27, and the internal pressure value of the air cell 28A of the ninth thoracic vertebra support device 28, are corrected and calculated to rectify the posture of the seated person based on the information regarding the seating posture of the seated person.

Thereafter, the control device 18 drives the corresponding driving devices 16 based on the corrected parameters of the driving devices 16. Thereby, the slide adjustment device 22, the height adjustment device 23, the tilt adjustment device 24, the middle-folding device 29, the expansion and contraction device 30, the reclining adjustment device 31, the headrest up/down device 32, the ischial tuberosity support device 26, the sacrum/ilium support device 27, and the ninth thoracic vertebra support device 28 are driven in accordance with the respective parameters corrected based on the information regarding the seating posture. Due to the driving of the ischial tuberosity support device 26, the sacrum/ilium support device 27, and the ninth thoracic vertebra support device 28, the position of the part of the seat cushion 5 corresponding to the ischial tuberosities P of the seated person, the position of the part of the seat back 6 corresponding to the sacrum Q and the ilia R, and the position of the part of the seat back 6 corresponding to the ninth thoracic vertebra part S are each controlled to correct the posture of the seated person. When the driving of each driving device 16 is completed, the control device 18 ends the seat adjustment process.

Next, effects of the vehicle seat 61 configured as above will be discussed. When the seating posture of the seated person exhibits an arched back or a slight arched back, it is preferred that the vehicle seat 61 is deformed such that the seating posture of the seated person is slightly sway-backed than the neutral posture to rectify the seating posture of the seated person. When the seating posture of the seated person exhibits a sway back or a slight sway back, it is preferred that the vehicle seat 61 is deformed such that the seating posture of the seated person exhibits a slightly arched back than the neutral posture.

In the present embodiment, the parameters of the driving devices 16 are corrected based on the seating posture of the seated person, and the driving devices 16 are driven based on the corrected parameters. Thereby, for example, the position of the part of the seat cushion 5 corresponding to the ischial tuberosities P of the seated person, the position of the part of the seat back 6 corresponding to the sacrum Q and the ilia R, and the position of the part of the seat back 6 corresponding to the ninth thoracic vertebra part S are each set to rectify the posture of the seated person in accordance with the seating posture. In this way, the vehicle seat 61 according to the present embodiment can set the correction amounts in accordance with the seating posture of the seated person and thereby can change the shape or the like thereof, and therefore, it is possible to provide the vehicle seat 61 with a function of adapting to the posture of the seated person.

Fourth Embodiment

Figure 10:
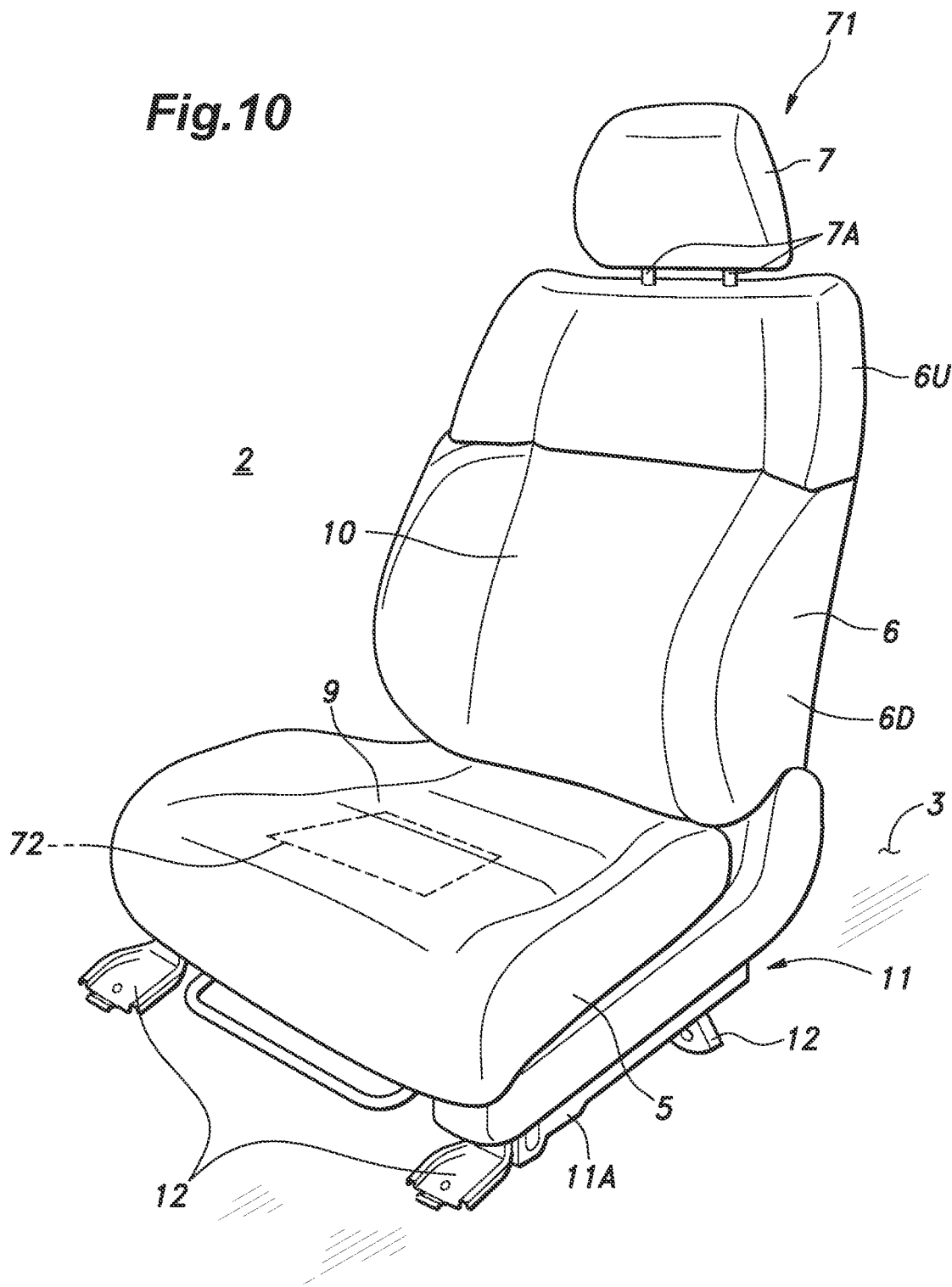
FIG. 10 is a perspective view of the vehicle seat according to the fourth embodiment.

A vehicle seat 71 according to the fourth embodiment differs from the vehicle seat 1 according to the first embodiment in that, as shown in FIG. 10, the vehicle seat 71 is provided with a seating sensor 72 for detecting the seating of the seated person. Also, the processing in step ST1 and step ST3 of the seat adjustment process differs. Further, in this embodiment, the control device 18 supplies a prescribed amount of air to each of the air cells 26A, 27A, 28A of the ischial tuberosity support device 26, the sacrum/ilium support device 27, and the ninth thoracic vertebra support device 28 when the seating is not detected by the seating sensor 72. In addition, the storage device 18A of the control device 18 holds a table in which internal pressure values of the air cells 26A, 27A, 28A of the ischial tuberosity support device 26, the sacrum/ilium support device 27, and the ninth thoracic vertebra support device 28 acquired when there is no seated person (for example, at the time of shipment from the factory) (hereinafter, initial pressures) are recorded beforehand (hereinafter, the table will be referred to as an initial pressure table). In the following, first, the processing in step ST1 of the seat adjustment process will be described.

In step ST1, the control device 18 acquires the internal pressure value of the air cell 26A of the ischial tuberosity support device 26, the internal pressure value of the air cell 27A of the sacrum/ilium support device 27, and the internal pressure value of the air cell 28A of the ninth thoracic vertebra support device 28 from the corresponding sensors 26C, 27C, 28C, Subsequently, the control device 18 calculates a difference between the acquired internal pressure value (the measured value of the internal pressure) of each air cell 26A, 27A, 28A and the internal pressure value of each air cell 26A, 27A, 28A recorded in the initial pressure table.

Then, based on the calculated difference, the control device 18 determines the seating posture group to which the seating posture of the seated person belongs. At this time, the control device 18 may determine the seating posture group by putting the acquired difference in a prescribed determination formula or, when the storage device 18A stores a table in which the relationship between the difference value and the seating posture group is depicted beforehand (hereinafter, a determination table), the control device 18 may determine the seating posture group by referring to the determination table.

Thereafter, in step ST3, similarly to the third embodiment the control device 18 refers to the correction table to acquire the correction amount corresponding to the seating posture group to which the seated person is determined to belong, and corrects the driving parameters accordingly. Then, the control device 18 drives the corresponding driving devices 16 based on the corrected driving parameters. Thereby, the driving devices 16 are driven to rectify the posture of the seated person.

Effects of the vehicle seat 71 according to the fourth embodiment will now be discussed. The control device 18 determines the seating posture of the seated person based on the difference between the measured internal pressure value of each air cell 26A, 27A, 28A and the assumed value of the internal pressure. Therefore, compared to the third embodiment, there is no need for the seated person to input the seating posture, and thus, it is possible to improve the convenience of the vehicle seat 71 for the seated person.

Also, the difference between the measured internal pressure value of each air cell 26A, 27A, 28A and the assumed value of the internal pressure corresponds to the pressure applied from the seated person to the parts corresponding to each air cell 26A, 27A, 28A. Therefore, by determining the seating posture based on the difference, the control device 18 can perform determination in line with the actual posture of the seated person.

Fifth Embodiment

Figure 11:
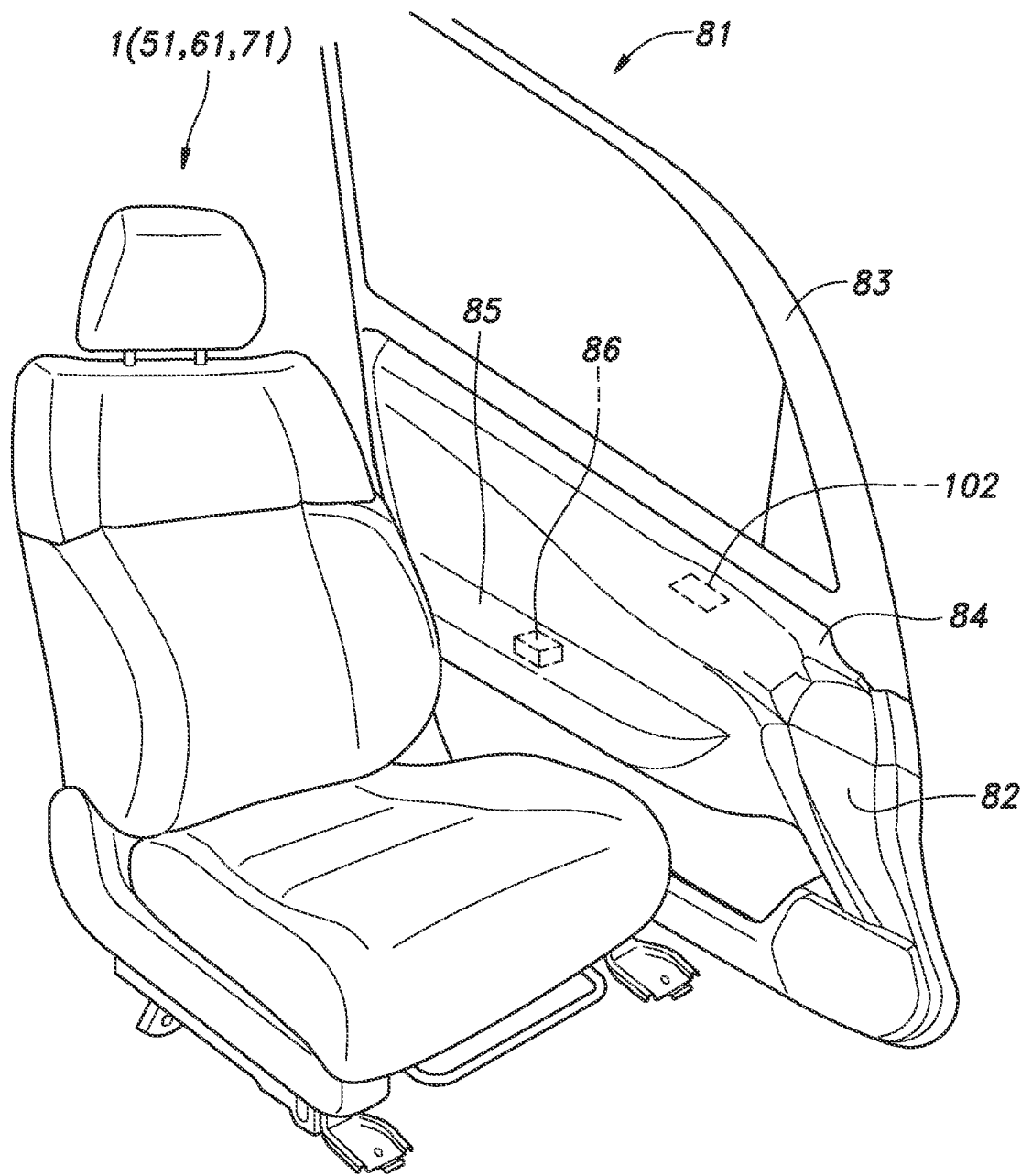
FIG. 11 is a perspective view showing an interior of the vehicle according to the present invention (fifth embodiment)

In the fifth embodiment, the present invention is applied to a vehicle 81 which, as shown in FIG. 11, includes the vehicle seat 1, 51, 61, 71 according to any of the first to fourth embodiments and a vehicle door 83 located on a side of the vehicle seat and having a door trim 82 on an inboard side thereof. The door trim 82 includes a door trim main body 84 fixed to the vehicle door 83 and an armrest 85 provided on the inboard side surface of the door trim main body 84. The armrest 85 is provided at a position of the door trim main body 84 corresponding to the arm of the seated person. The door trim main body 84 is provided with an actuator 86 (armrest driving device) for moving the armrest 85 vertically and making the armrest 85 protrude toward the seated person based on a signal from the control device 18.

The control device 18 executes the seat adjustment process similar to that executed in the first to fourth embodiments. However, the present embodiment differs from the other embodiments in that step ST3 of the seat adjustment process executed by the control device 18 includes an armrest adjustment process. Also, the storage device 18A additionally stores an armrest driving table. In the following, the armrest driving table and the armrest adjustment process will be described.

The armrest driving table indicates the relationship of the height range, the weight range, and the body type group number with the parameters for driving the armrest 85 (hereinafter, armrest driving parameters), and in the present embodiment, the armrest driving table states an amount of vertical movement and an amount of protrusion of the armrest 85 appropriate for the seated person corresponding to each height range, weight range, and body type group.

In the armrest adjustment process, the control device 18 refers to the armrest driving table and, based on the physique information of the seated person, acquires the armrest driving parameters corresponding to the height range, the weight range, and the body type group to which the seated person belongs. Thereafter, the control device 18 controls the actuator 86 to change the vertical position and the amount of protrusion of the armrest 85 to correspond to the armrest driving parameters. Thereby, the armrest 85 is moved up and down and protrudes toward the seated person as necessary to conform to the seated person.

Next, effects of the vehicle 81 according to the present embodiment will be discussed. The control device 18 sets the amount of vertical movement and the amount of protrusion of the armrest 85 to match the physique of the seated person and drives the armrest 85 accordingly. Thereby, without reception of an input of the amount of movement of the armrest 85 from the seated person, the armrest 85 is automatically adjusted such that the arm of the seated person is disposed at a position comfortable to the seated person. Thus, the burden on the body of the seated person is reduced, whereby the fatigue of the seated person can be reduced.

Concrete embodiments have been described in the foregoing, but the present invention is not limited to the above embodiments and may be modified or altered in various ways. In the above embodiments, the control device 18 calculated the various parameters for driving the driving devices 16 based on the height, weight, and body type group, but the present invention is not limited to this. The body type group is not indispensable to the calculation of the various parameters for driving the driving devices 16, and the control device 18 may be configured to calculate the various parameters for driving the driving devices 16 based on only the height and the weight, for example. It is to be noted, however, that by calculating the various parameters for driving the driving devices 16 based on the body type group, it is possible to move and/or deform the vehicle seat 1 better in accordance with the physique of the seated person.

In the above-described fourth embodiment, configuration was made to determine the seating posture group based on the differences between the internal pressure values of the air cells 26A, 27A, 28A and the respective initial pressures, but the present invention is not limited to this embodiment. As shown in FIG. 11, multiple pressure receiving sensors 91 may be provided on the seating surface 9 and the support surface 10. Each pressure receiving sensor 91 has a sensor surface 92 and is capable of acquiring an average value and/or a pressure distribution of the pressure applied to the sensor surface 92. The control device 18 may determine the seating posture group corresponding to the posture of the seated person based on the pressure of each pressure receiving sensor 91. Here, configuration may be made such that pressure receiving sensors 91A, 91B are disposed on the right and left sides to form pairs and the seat back 6 and the seat cushion 5 are each provided with a pair of right and left air cells 93A, 93B to selectively cause the corresponding support surface 10 or seating surface 9 to protrude. The control device 18 preferably controls the right and left air cells 93A. 93B to make the support surface 10 and/or the seating surface 9 protrude as necessary to rectify the posture of the seated person in the lateral direction based on the difference in pressure between the pressure receiving sensors 91A, 91B forming the respective pairs.

In the above-described third and fourth embodiments, the correction amount was set to rectify the posture of the seated person, but the present invention is not limited to these embodiments. In the reception process, the terminal 17 may receive selection of a desired posture (for example, a neutral posture, a relaxed posture in which the burden on the seated person is smaller than in the neutral posture, and a rectified posture) from the seated person, and the control device 18 may set the correction amount in accordance with the selection.

In the above-described third and fourth embodiments, the correction amount was set based on the posture of the seated person, but the present invention is not limited to these embodiments. For example, the correction amount may be set based on the body state of the seated person such as sleep state, heart rate, body temperature, physical condition, etc., and may be set based on the flexibility of the body of the seated person. Also, the correction amount may be set based on the environment inside and/or outside the vehicle such as the season, cabin temperature, etc.

Figure 12:
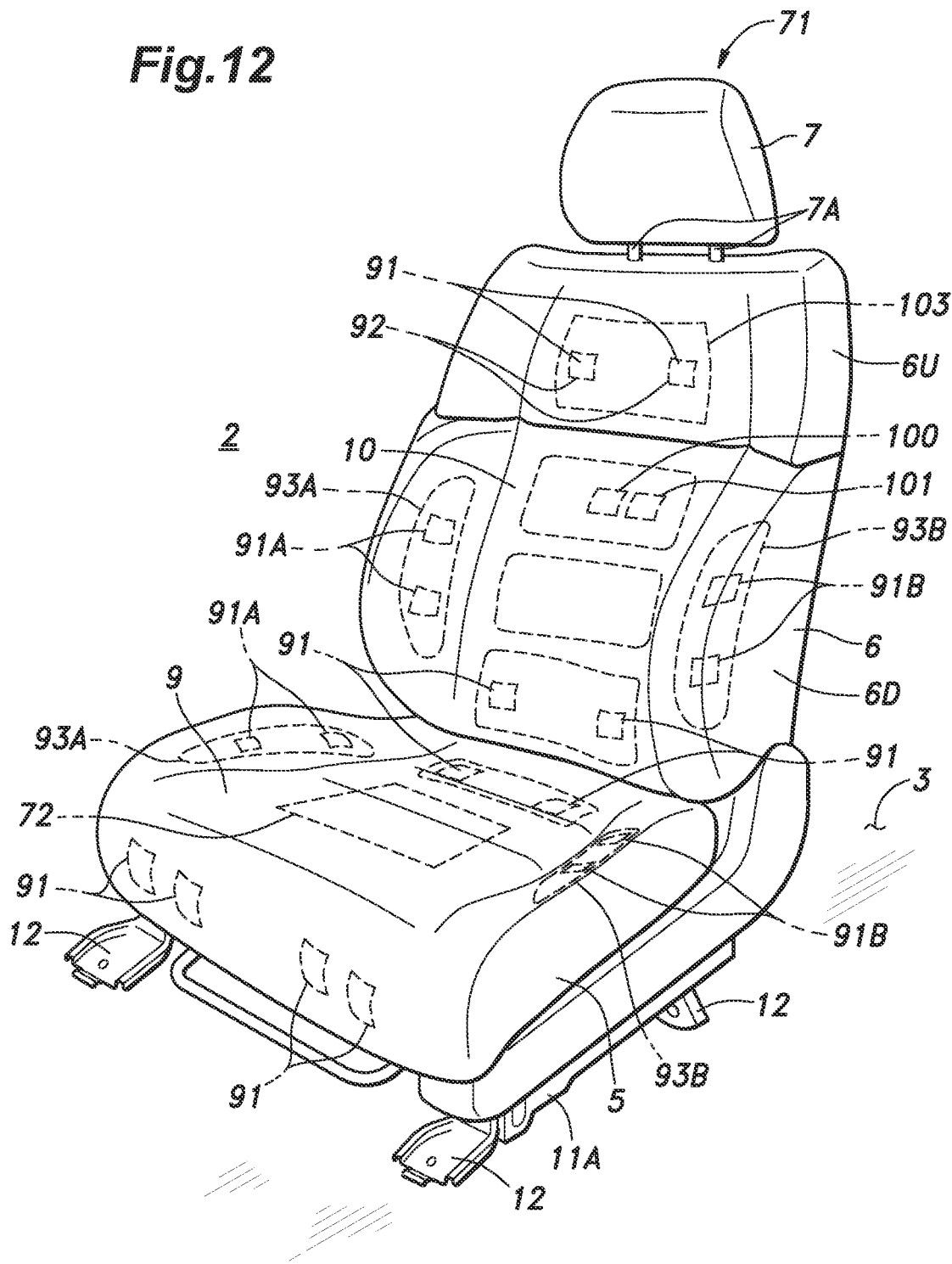
FIG. 12 is a perspective view showing a modification of the vehicle seat according to the fourth embodiment.

More specifically, it is preferred that, for example, the vehicle seat 1 is provided with a temperature sensor 100 (see FIG. 12) for measuring the temperature on the seating surface 9 or the support surface 10, so that when it is determined that the body temperature of the seated person is higher than a prescribed temperature, the control device 18 reduces the correction amount to put the seated person in the neutral posture (or relaxed posture). Similarly, it is preferred that the vehicle seat 1 is provided with a heart rate sensor 101 (see FIG. 12) for the seated person on the seating surface 9 or the support surface 10 so that when it is determined, based on a signal from the heart rate sensor 101, the physical condition of the seated person is not good, the control device 18 sets the correction amount to put the seated person in the neutral posture (or relaxed posture) (for example, reduce the correction amount when rectifying the posture). The heart rate sensor 101 is preferably provided on a left side part of the seat hack 6. Also preferably, the control device 18 may acquire a signal from a cabin temperature sensor 102 (see FIG. 11) provided inside the vehicle (for example, on the door trim 82 or the like) so that when it is determined that the cabin temperature is higher than a prescribed temperature, the control device 18 sets the correction amount to make the posture of the seated person approach the neutral posture (or relaxed posture). Thereby, the posture of the seated person is made suitable for the body state, and thus, it is possible to reduce fatigue of the seated person.

In the fifth embodiment, the armrest 85 was configured to be capable of moving up and down and protruding toward the seated person, but is not limited to this embodiment. The armrest 85 is only required to be driven to exhibit at least one of vertical movement, lateral movement, and protrusion toward the seated person based on the signal from the control device 18 so that at least one of the vertical position, the lateral position, and the amount of protrusion is changed based on the signal from the control device 18.

In the above embodiments, configuration may be made such that after the output step (ST3) is completed, the terminal 17 receives a correction amount from the seated person, and the shape of the vehicle seat 1 is changed based on the correction amount. At this time, the control device 18 may store the correction amount received from the seated person in the storage device 18A together with the physique information of the seated person. The control device 18 may further modify the driving parameters stated in the driving table based on the relationship between the stored body type of the seated person and the correction amount.

In the above embodiments, the vehicle seat 1, 51, 61, 71 was provided with the air cells 26A, 27A, 28A at positions corresponding to the ischial tuberosities P, the sacrum Q, the ilia R, and the ninth thoracic vertebra part S, but in addition to them, an air cell 103 may be provided at a position corresponding to another part of the seated person (for example, the upper seat back 6U) to rectify the posture of the seated person. Also, in the above embodiments, the air cells 26A, 27A, 28A were provided between the pad member 4A, 5A and the skin member 5B, 6B, but the air cells 26A, 27A, 28A may be provided on the back side of the pad member 4A, 5A (the rear side of the seat back 6, and the lower side of the seat cushion 5). Also, instead of the air cells 26A, 27A, 28A, the vehicle seat 1, 51, 61, 71 may be provided with any known actuators for changing the position of the seating surface 9 or the support surface 10.

LIST OF REFERENCE NUMERALS 1 vehicle seat according to first embodiment
5 seat cushion
5A pad member
5B skin member
6 seat back
6A pad member
6B skin member
16 driving device
17 terminal
18 control device
26 ischial tuberosity support device
26A air cell
26C sensor
27 ilium support device
27A air cell
27C sensor
28 ninth thoracic vertebra support device
28A air cell
28C sensor
40 reception area
51 vehicle seat according to second embodiment
52 reception area
61 vehicle seat according to third embodiment
62 reception area
71 vehicle seat according to fourth embodiment
81 vehicle
85 armrest
P ischial tuberosity
Q sacrum
R Rims
S ninth thoracic vertebra part
ST1 step (acquisition step)
ST2 step (decision step)
ST3 step (output step)

The invention claimed is:

1. A vehicle seat provided with a seat cushion and a seat back, comprising:
  an ischial tuberosity support device configured to be driven to change a position of a part of the seat cushion corresponding to ischial tuberosities of a seated person;
  a sacrum/ilium support device configured to be driven to change a position of a part of the seat back corresponding to a sacrum and/or ilia of the seated person;
  a ninth thoracic vertebra support device configured to be driven to change a position of a part of the seat back corresponding to a ninth thoracic vertebra part of the seated person; and
  a control device configured to control driving of the ischial tuberosity support device, the sacrum/ilium support device, and the ninth thoracic vertebra support device,
  wherein the control device is configured to sequentially execute:
  an information acquisition step of acquiring physique information of the seated person;

a decision step of deciding at least three parameters regarding respective driving amounts of the ischial tuberosity support device, the sacrum/ilium support device, and the ninth thoracic vertebra support device based on the physique information acquired in the information acquisition step to make each of the positions conform to a physique of the seated person;

an output step of driving the ischial tuberosity support device, the sacrum/ilium support device, and the ninth thoracic vertebra support device based on the corresponding parameters, each of the seat cushion and the seat back includes a pad member and a skin member covering a surface of the pad member;

each of the ischial tuberosity support device, the sacrum/ilium support device, and the ninth thoracic vertebra support device includes an air cell disposed between the skin member and the pad member, a sensor configured to acquire an internal pressure value of the air cell, and an air supply and exhaust device configured to supply and exhaust air to and from the air cell to make the internal pressure value a prescribed pressure value;

the driving amount of each of the ischial tuberosity support device, the sacrum/ilium support device, and the ninth thoracic vertebra support device is the prescribed pressure value of the internal pressure value of the corresponding air cell;

the physique information includes information regarding a height, a weight, a body type, and a seating posture of the seated person; and the control device acquires the information regarding the seating posture according to the internal pressure value acquired by the sensor of the air cell of each of the ischial tuberosity support device, the sacrum/ilium support device, and the ninth thoracic vertebra support device, and corrects the driving amount of each of the ischial tuberosity support device, the sacrum/ilium support device, and the ninth thoracic vertebra support device according to the corresponding internal pressure value acquired by the sensor.

2. The vehicle seat according to claim 1, wherein, in the decision step, the control device decides the driving amounts of the ischial tuberosity support device, the sacrum/ilium support device, and the ninth thoracic vertebra support device so as to reproduce a shape of a back of a human body model in a neutral posture based on the physique information.

3. The vehicle seat according to claim 1, wherein the physique information includes information regarding a height and a weight of the seated person, and in the decision step, the control device decides the driving amount of each of the ischial tuberosity support device, the sacrum/ilium support device, and the ninth thoracic vertebra support device based on the information regarding the height and the weight of the seated person.

4. The vehicle seat according to claim 3, comprising a terminal configured to display information to the seated person based on a signal from the control device and to receive an input from the seated person to output the received input to the control device, the terminal being configured to display a reception area to receive an input or selection of the height and the weight from the seated person.

5. The vehicle seat according to claim 4, wherein the terminal determines a body type of the seated person based on the information regarding the height and the weight, and in the decision step, the control device decides the driving amount of each of the ischial tuberosity support device, the sacrum/ilium support device, and the ninth thoracic vertebra support device based on the height, the weight, and the determined body type.

6. The vehicle seat according to claim 1, wherein the physique information includes information regarding a height, a weight, and a body type of the seated person, and in the decision step, the control device decides the driving amount of each of the ischial tuberosity support device, the sacrum/ilium support device, and the ninth thoracic vertebra support device based on the information regarding the height, the weight, and the body type of the seated person.

7. The vehicle seat according to claim 6, comprising a terminal configured to display information to the seated person based on the signal from the control device and to receive an input from the seated person to output the received input to the control device, the terminal being configured to display a reception area to receive an input or selection of the information regarding the height, the weight, and the body type of the seated person.

8. The vehicle seat according to claim 1, wherein the physique information includes information regarding a height, a weight, a body type, and a seating posture of the seated person, and in the decision step, the control device decides the driving amount of each of the ischial tuberosity support device, the sacrum/ilium support device, and the ninth thoracic vertebra support device based on the information regarding the height, the weight, the body type, and the seating posture of the seated person.

9. A vehicle provided with the vehicle seat according to claim 1 and an armrest provided to be positioned on a side of the seated person, the vehicle comprising an armrest driving device configured to change at least one of a vertical position of the armrest, a lateral position of the armrest, and an amount of protrusion of the armrest toward the seated person, wherein the control device is configured:

to decide, in the decision step, the position of the armrest based on the physique information acquired in the information acquisition step, and to control, in the output step, driving of the armrest driving device toward the position decided in the decision step.

* * * * *